(12) United States Patent
Hayashi

(10) Patent No.: US 8,184,965 B2
(45) Date of Patent: May 22, 2012

(54) IMAGING DEVICE

(75) Inventor: Kenichi Hayashi, Nara (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/972,533

(22) Filed: Dec. 20, 2010

(65) Prior Publication Data

US 2011/0164863 A1 Jul. 7, 2011

(30) Foreign Application Priority Data

Jan. 5, 2010 (JP) ................. 2010-000783
Dec. 14, 2010 (JP) ................. 2010-278323

(51) Int. Cl.
*G03B 17/00* (2006.01)
(52) U.S. Cl. ...................................... 396/55
(58) Field of Classification Search ............ 396/55; 348/208.7, 208.8, 208.11, 208.12
See application file for complete search history.

(56) References Cited

U.S. PATENT DOCUMENTS 7,405,750 B2* 7/2008 Uenaka et al. ........... 348/208.99
7,840,128 B2* 11/2010 Takagi et al. .................. 396/55
2007/0188619 A1 8/2007 Kurata
2008/0180536 A1 7/2008 Nakahara
2011/0164863 A1* 7/2011 Hayashi ...................... 396/55

FOREIGN PATENT DOCUMENTS

| JP | 64-078581 A | 3/1989 |
| JP | 2004-282535 A | 10/2004 |
| JP | 2005-176050 A | 6/2005 |
| JP | 2007-215114 A | 8/2007 |
| JP | 2007-243579 A | 9/2007 |
| JP | 2007-281831 A | 10/2007 |
| JP | 2008-107665 A | 5/2008 |
| JP | 2009-139423 A | 6/2009 |
| JP | 2009-182624 A | 8/2009 |

* cited by examiner

*Primary Examiner* — W. B. Perkey
(74) *Attorney, Agent, or Firm* — Shinjyu Global IP

(57) ABSTRACT

An imaging device includes an optical system, an imaging unit, a movable member, a drive unit, a second detection unit, and a selection unit. The optical system is configured to form an optical image of a subject. The imaging unit is configured to receive an image signal of the optical image. The first detection unit is configured to detect vibration of the imaging device. The movable member includes at least one of a portion of the optical system and a portion of the imaging unit. The drive unit is configured to move the movable member based on the detected vibration. The second detection unit is configured to detect movement of the movable member. The selection unit is configured to select a first image area based on the detected vibration and the detected movement, and the first image area is used to determine a characteristic value based on the image signal.

14 Claims, 11 Drawing Sheets

IMAGING DEVICE

CROSS-REFERENCE TO RELATED APPLICATIONS

This application claims priority under 35 U.S.C. §119 to Japanese Patent Application No. 2010-000783, filed on Jan. 5, 2010, and Japanese Patent Application No. 2010-278323, filed on Dec. 14, 2010. The entire disclosure of Japanese Patent Application No. 2010-000783 and Japanese Patent Application No. 2010-278323 are hereby incorporated herein by reference.

BACKGROUND

1. Technical Field

The technology disclosed herein relates to camera systems, and more particularly, relates to a digital camera provided with a shake correction device.

2. Background Information

When an imaging device is shaken during photography, an optical image formed by an optical system is displaced relative to an imaging element, and the obtained image is probably blurred. Therefore, in order to decrease an influence applied by the shake of the imaging device to the image, a shake correction device is used.

For example, the shake correction device includes a correction unit for driving a correction lens, an angular velocity sensor for detecting a shake amount of a housing, and a correction control unit for controlling an operation of the correction unit according to output of the angular velocity sensor. In the imaging device on which the shake correction device is mounted, the correction lens is driven by the correction unit based on the shake amount detected by the angular velocity sensor so that the displacement of the optical image relative to the imaging element is restrained.

However, when the shake amount is large, it is sometimes not possible to sufficiently cancel out the displacement of the optical image even when the correction lens is driven to the limit of a movement enabled range. Therefore, in an imaging device of Japanese Patent Laid-Open Publication No. JP2005-176050, an exposure time during photography is set short in order to restrain an increase of shake amount. Moreover, in this imaging device, centering is executed before a start of the exposure so that the correction lens is returned to an initial position. Further, in the imaging device in Japanese Patent Laid-Open Publication No. JP2005-176050, when a plurality of images photographed in a short exposure time are overlaid, a synthesized image in which the influence of the shake of the imaging device is restrained is generated.

Japanese Patent Laid-Open Publication No. JP2008-107665 provides one countermeasure in a case where the influence of the shake of the imaging device is not sufficiently decreased by the shake correction device. Japanese Patent Laid-Open Publication No. JP2008-107665 discusses a technology for canceling a search operation when the shake of the imaging device is detected partway through an operation for searching a subject to be focused.

On the other hand, Japanese Patent Application Laid-Open Publication No. JP2004-282535 discusses a technology for detecting an object to be noticed from an image obtained by imaging. In this technology, even when the object is moving, the position of the object can be relatively accurately predicted by decreasing the influence exerted by the shake of the imaging device on the image.

Moreover, Japanese Patent Laid-Open Publication No. JP2007-243579 discuses a technology for calculating an error in the shake correction by comparing the shake amount and a movement amount of the correction lens. In this technology, a position at which an image signal representing a photographed image is cut is adjusted according to the error in the shake correction.

However, even when the centering is executed, the position of the subject on the image is deviated according to the shake amount of the imaging device at a time point at which the centering is ended. Thus, in order to generate the synthesized image as in the Patent Document 1, it is necessary to efficiently detect the change of the position of the subject on the image.

Likewise, when the influence of the shake of the imaging device is not sufficiently decreased by the shake correction device, it is necessary to efficiently detect the change of the position of the subject on the image in order to, for example, maintain a focal state on the subject by an autofocus operation.

Moreover, in order to accurately detect a moving object from the image, it is necessary to perform detection in consideration of the influence of the shake amount not compensated by the shake correction device.

On the other hand, when the influence of the shake of the imaging device within the exposure time is not sufficiently decreased by the shake correction device, the shake of the imaging device influences the image.

In this way, there is a desire for an imaging device capable of securing the processing accuracy for the photographed image even when the influence of the shake of the imaging device is not sufficiently decreased by the shake correction device.

SUMMARY

To solve the above-described problems, an imaging device is provided that includes an optical system, an imaging unit, a movable member, a drive unit, a second detection unit, and a selection unit. The optical system is configured to form an optical image of a subject. The imaging unit is configured to receive an image signal of the optical image. The first detection unit is configured to detect the amount of vibration of the imaging device. The movable member includes at least one of a portion of the optical system and a portion of the imaging unit. The drive unit is configured to move the movable member based on the detected amount of vibration. The second detection unit is configured to detect the amount of movement of the movable member. The selection unit is configured to select a first image area based on the detected amount of vibration of the imaging device and on the detected amount of movement of the movable member. The first image area is used to determine a characteristic value based on the image signal.

These and other features, aspects and advantages of the present invention will become apparent to those skilled in the art from the following detailed description, which, taken in conjunction with the annexed drawings, discloses embodiments of the present invention.

BRIEF DESCRIPTION OF DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Hereinafter, by using a digital camera as an example, embodiments of an imaging device discussed herein will be explained.

First Embodiment

A digital camera 100 (an example of an imaging device) according to the first embodiment will be explained by using FIG. 1 to FIG. 8.

1.1 Configuration of Digital Camera

Figure 1:
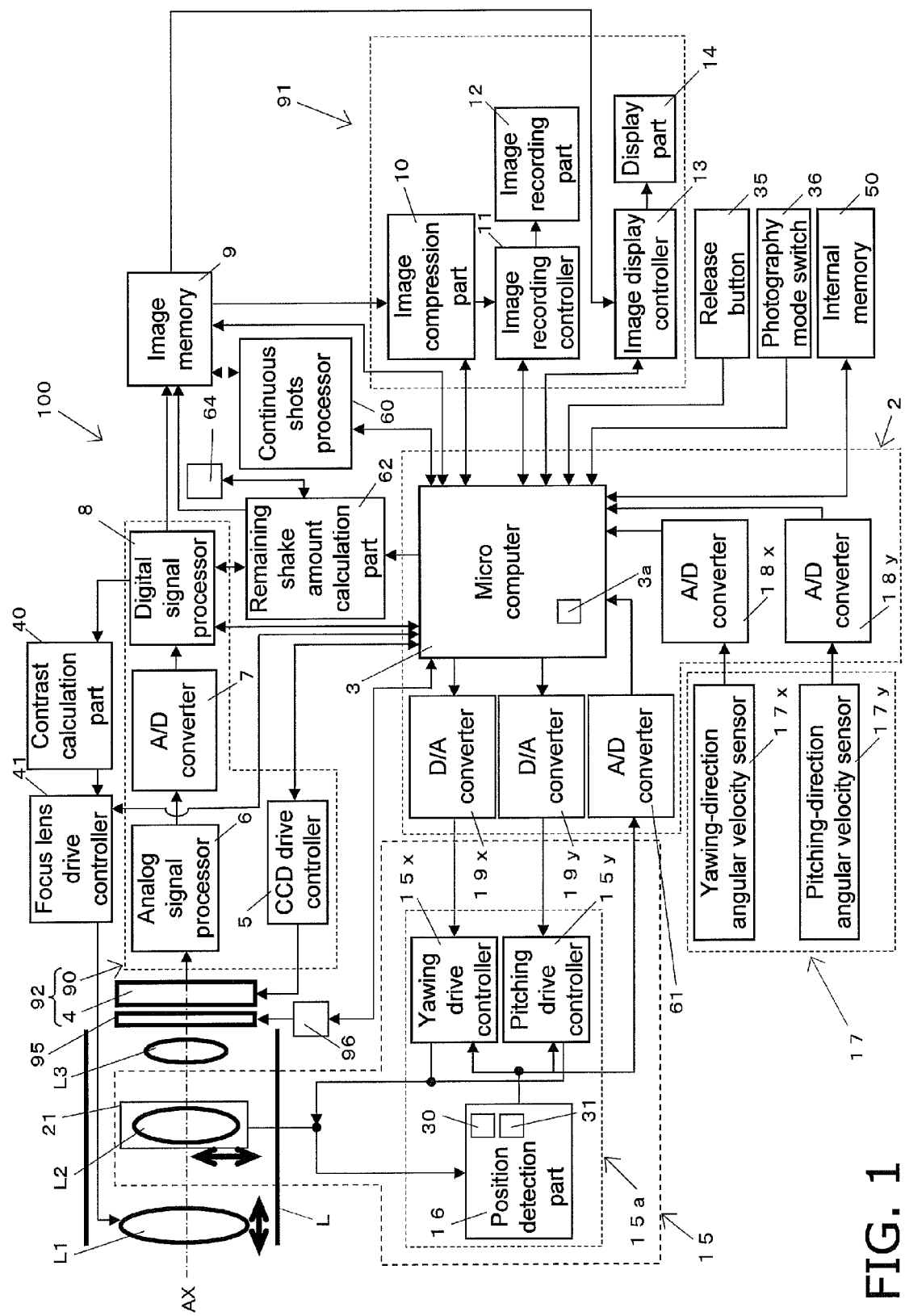
FIG. 1 is a block diagram of a whole configuration of a digital camera 100.

As shown in FIG. 1, the digital camera 100 is provided mainly with an optical system L, a Charge Coupled Device (CCD) 4, an imaging processor 90, an image memory 9, a record display processor 91, a central controller 2 including a micro computer 3, a continuous shots processor 60, a contrast calculation part 40, a focus lens drive controller 41, and an internal memory 50, a release button 35 for instructing execution of photography, and a photography mode switch 36 for switching photographing modes.

Further, the digital camera 100 includes an angular velocity sensor 17 for detecting shake of the digital camera 100, a shake correction part 15, a remaining shake amount calculation part 62, and a variation-width calculation part 64 for calculating a variation width of a remaining shake amount.

Moreover, the digital camera 100 includes a housing (not shown) for housing or mounting each of the above-described configurations on the digital camera 10. Specifically, the optical system L and the CCD 4 are supported inside the housing.

Optical System

Firstly, the optical system L will be explained. The optical system L forms an optical image of a subject (hereinafter, also referred to as "subject image") and focuses the image on the CCD 4. The optical system L includes a first lens group L1, a second lens group L2, and a third lens group L3.

The first lens group L1 is a so-called focus lens group, and is used for focusing the subject image on the CCD 4 in a focused state (hereinafter, referred to as "focal state"). When the first lens group L1 is moved in a direction parallel to an optical axis AX (hereinafter, referred to as "optical axis direction"), a focal operation is performed. The first lens group L1 is driven in the optical axis direction by, for example, a stepping motor (not shown) in the focal operation by a contrast detection system (described later).

The second lens group L2 is a so-called shake correction lens group, and is used for compensating the displacement of the subject image on the CCD 4 caused by the shake when shake of the digital camera 100 (hereinafter, simply referred to as "shake") when the shake occurs. The second lens group L2 is held by a second lens group holding frame 21 (described later) to enable movement of the second lens group L2 on a plane vertical (or perpendicular) to the optical axis direction.

When the second lens group L2 moves from a normal position, an effect equivalent to inclination of the optical axis AX occurs. The normal position of the second lens group L2 is a position at which the second lens group L2 is disposed when there is no position movement by the shake correction (described later). When the second lens group L2 is moved in the direction vertical to the optical axis direction, the influence exerted by the shake of the digital camera 100 on the image can be corrected.

The third lens group L3 is a so-called zoom lens group and is used for adjusting a focal length. When the third lens group L3 is moved in the optical axis direction to change the focal length, zooming is performed. The third lens group L3 is driven by, for example, a DC motor (not shown) and moves in the optical axis direction.

Imaging Unit

An imaging unit includes: the CCD 4, a shutter 95, a shutter controller 96, the imaging processor 90, and the image memory 9. The imaging processor 90 includes: a CCD drive controller 5, an analog signal processor 6, an A/D converter 7, and a digital signal processor 8, and generates an obtained image. In the first embodiment, an imaging part 92 (an example of an imaging unit) is formed by the CCD 4 and the imaging processor 90.

The CCD 4 converts the subject image formed by the optical system L into an electrical signal, i.e., an analog image signal. It is noted that in the digital camera 100, the CCD 4 is used as an imaging element; however, a Complementary Metal Oxide Semiconductor (CMOS) image sensor may be used instead of the CCD 4. It is noted that the imaging part 92 may be configured only by the imaging element.

The CCD drive controller 5 (an example of an exposure adjustment unit) controls the CCD 4. Specifically, a timing at which the electrical signal is read from the CCD 4 is controlled by the CCD drive controller 5. When a timing at which the electrical signal is read from the CCD 4 is changed, an effect substantially similar to that obtained by changing the exposure time of the CCD 4 can be provided. In this way, the CCD drive controller 5 includes a so-called electronic shutter function. The CCD drive controller 5 accepts the control signal of the micro computer 3.

The shutter 95 (an example of an exposure adjustment unit) is provided between the optical system L and the CCD 4, and adjusts the exposure time of the CCD 4. The shutter 95 includes a light-shielding curtain (not shown). The shutter 95 opens and closes the light-shielding curtain by a mechanical operation to adjust the exposure time of the CCD 4. A time that lasts from the opening of the shutter 95 to the closing of the shutter 95 the same is the exposure time.

The opening/closing of the shutter 95 is controlled by the shutter controller 96. When the shutter controller 96 is applied the control signal from the micro computer 3, the shutter controller 96 operates a shutter drive motor (not shown) to open/close the shutter 95 at a control signal-based speed.

The electrical signal outputted from the CCD 4 is subjected to various processing operations in the imaging processor 90. The analog signal processor 6 performs analog signal processing such as gain adjustment on the electrical signal outputted from the CCD 4, i.e., the analog image signal. The A/D converter 7 coverts the analog image signal outputted from the analog signal processor 6 into a digital image signal (such a conversion from an analog signal into a digital signal is referred to as "A/D conversion" below even when the signal is not an image signal, and a conversion from the digital signal into the analog signal is referred to as "D/A conversion").

The digital signal processor 8 performs digital signal processing, such as noise removal or profile emphasis, on the image signal converted into the digital signal by the A/D converter 7. The digital image signal (an example of an image signal) outputted from the digital signal processor 8 is the image data representing the image obtained from the optical image of the subject. Hereinafter, the image configured by the digital image signal outputted from the digital signal processor 8 is referred to as "obtained image". The digital signal processor 8 performs the digital signal processing under the control of the micro computer 3.

The image memory 9 is a writable/readable memory, and is a Random Access Memory (RAM), for example. The image memory 9 stores the obtained image. Specifically, the image memory 9 temporarily stores the digital image signal processed by the digital signal processor 8, i.e., the image data of the obtained image. In a continuous shots synthesis mode (described later), a plurality of obtained images continuously imaged are stored, as continuous shots, in the image memory 9.

Moreover, the image memory 9 temporarily stores not only the image data but also a remaining shake amount and a remaining shake PP value, which are described later, obtained from the remaining shake amount calculation part 62 and the variation-width calculation part 64. More particularly, the remaining shake amount is temporarily stored in the image memory 9 in a state where the remaining shake amount is associated with the image data representing the corresponding obtained image.

Record Display Processor

The record display processor 91 includes a function of recording and displaying the obtained image read from the image memory 9, and includes: an image compression part 10; an image recording controller 11; an image recording part 12; an image display controller 13; and a display part 14. The image data read from the image memory 9 is sequentially processed in the image compression part 10, the image recording controller 11, and the image recording part 12.

The image compression part 10 reads the image data from the image memory 9 based on the control signal applied from the micro computer 3, and compresses the image data to a predetermined size. At this time, the image data is compressed by a predetermined ratio, and converted into data smaller in size than the original data. For example, as the compression method, a Joint Photographic Experts Group (JPEG) system may be used. Moreover, the image compression part 10 generates reduced image data used for a thumbnail display, etc., by using the image data read from the image memory 9.

Based on the control signal applied from the micro computer 3, the image recording controller 11 receives the compressed image data and the reduced image data from the image compression part 10, and then records these data items on the image recording part 12. The image recording part 12 is configured by an internal memory 50 provided in the digital camera 100 main body and/or a detachable removable memory (i.e., an external memory).

In the image recording part 12, the image data, the corresponding reduced imaged data, and predetermined information to be recorded are recorded in a mutually associated manner, based on the control signal applied from the image recording controller 11. The predetermined information to be recorded used herein includes, for example, a date/time on which the obtained image is imaged, focal length information, shutter speed information, aperture value information, and photography mode information.

The display part 14 is configured by, for example, an LCD panel and displays the image data stored in the image memory 9, as a visible image. When the image display controller 13 is applied the control signal from the micro computer 3, the image display controller 13 reads the image data stored in the image memory 9 based on the control signal. The image display controller 13 displays the read image data, as the visible image, on the display part 14. Thus, the image display controller 13 performs drive control of the display part 14. Hereinafter, the image as an output image of the digital camera 100 is referred to as "photographed image". Specifically, the photographed image can be displayed on the display part 14, and can be stored, as an image file, in the external memory. The photographed image may be obtained image itself or an image obtained by performing imaging processing on the obtained image. For example, the photographed image may be an image generated by cutting a part of a region of the obtained image.

Central Controller

The central controller 2 includes: the micro computer 3; A/D converters 18$x$ and 18$y$; D/A converters 19$x$ and 19$y$; and an A/D converter 61.

The micro computer 3 is a control unit that forms the basis of controlling the entire digital camera 100. The micro computer 3 includes, for example, a Micro Processing Unit (MPU), a Read Only Memory (ROM), and a RAM 3$a$ which are not shown, and can perform various processing by reading a program written on a ROM and operating the program on the MPU. The micro computer 3 transmits and receives the data or the control signal to and from not only the above-described digital signal processor 8 but also, for example, the continuous shots processor 60 and the focus lens drive controller 41 so as to control the entire digital camera 100.

The A/D converters 18$x$ and 18$y$ perform A/D conversion on the signal between an angular velocity sensor 17 (described later) and the micro computer 3. The D/A converters 19$x$ and 19$y$ perform D/A conversion on the signal between the movement controller 15$a$ (described later) and the micro computer 3. The A/D converter 61 performs A/D conversion on the signal between the movement controller 15$a$ and the micro computer 3.

Continuous Shot Processor

When a continuous shots synthesis mode (described later) is selected by a user, multiple imaging operations are performed in single photography. A plurality of obtained images obtained in the continuous shots synthesis mode are stored, as the continuous shots, in the image memory 9.

Figure 3:
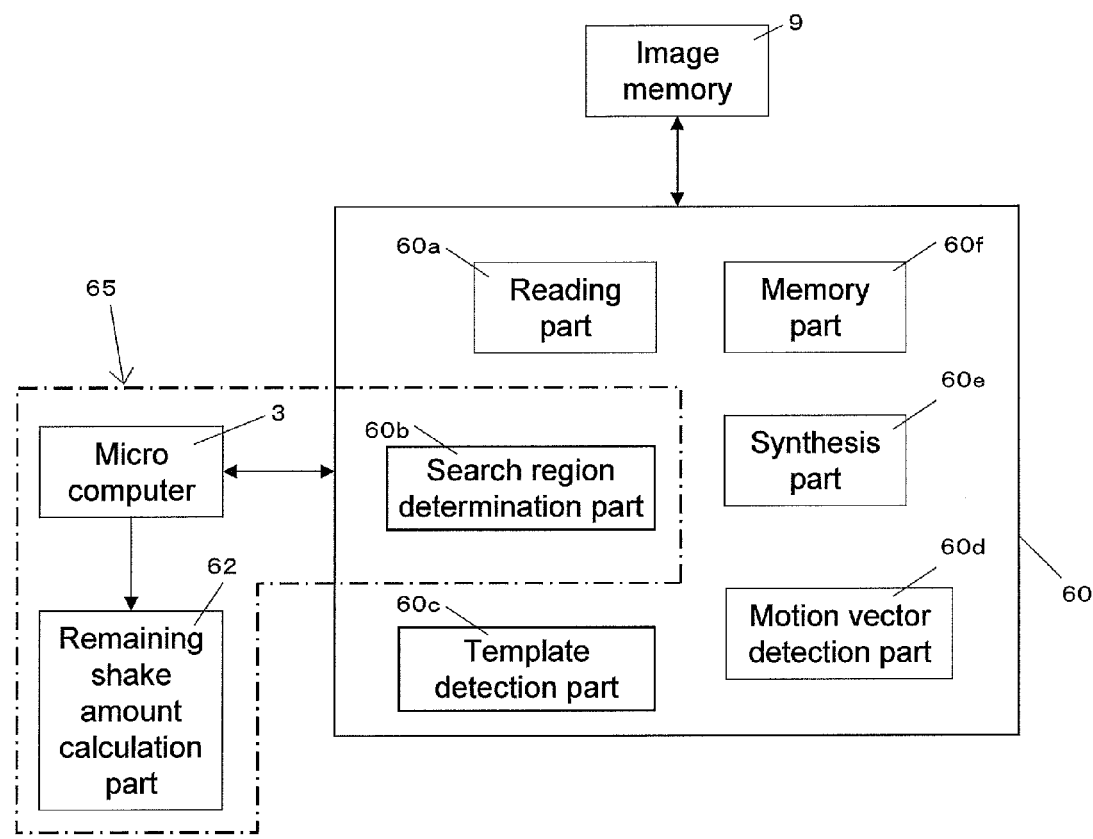
FIG. 3 is a block diagram of a continuous shots processor 60.

The continuous shots processor 60 reads the continuous shots from the image memory 9, and performs processing on the continuous shots. As shown in FIG. 3, the continuous shots processor 60 includes: a reading part 60a; a search region determination part 60b; a template detection part 60c; a motion vector detection part 60d; a synthesis part 60e; and a memory part 60f. As shown in FIG. 3, in the first embodiment, a selection part 65 (an example of a selection part) is formed by the search region determination part 60b, the remaining shake amount calculation part 62, and the micro computer 3.

The reading part 60a (an example of a determination part) reads the continuous shots from the image memory 9. The search region determination part 60b sets search regions I on the continuous shots. The search region I is a region in which search is executed when a matching region M (described later) is detected. The template detection part 60c (an example of a characteristic region detection part) detects the matching region M from the search region I. The motion vector detection part 60d detects a motion vector representing a change of a position of the matching region M, based on positions of the template block T and the matching region M on the obtained images. The synthesis part 60e uses the motion vector detected in the motion vector detection part 60d to generate one synthesized image from the continuous shots. The memory part 60f is, for example, a RAM and is used as a working memory in the processing of the continuous shots in the continuous shots processor 60. For example, the memory part 60f stores information about a position and a shape of a reference region W (described later).

The synthesized image generated in the continuous shots processor 60 is stored in the image memory 9. The processing executed on the continuous shots in the continuous shots processor 60 will be explained in detail later.

Autofocus Unit

The autofocus (hereinafter, referred to as "AF") unit is a unit for controlling the focal operation, and includes the contrast calculation part 40 (an example of a focal information calculation part) and the focus lens drive controller 41 (an example of a focal controller).

The contrast calculation part 40 calculates an evaluation value of the obtained image in the focal operation of a so-called contrast detection system. The focus lens drive controller 41 executes focal control. Specifically, the focus lens drive controller 41 drives the first lens group L1 in the optical axis direction so as to obtain a focal state, based on the evaluation value calculated by the contrast calculation part 40.

At this time, an autofocus by the contrast detection system in the digital camera 100 (hereinafter, referred to as "contrast AF") will be explained. In the contrast AF, imaging and evaluation value calculation are repeatedly executed while the position of the first lens group L1 is changed, and when the first lens group L1 is moved to a position at which the evaluation value peaks, the focal state is realized.

In the contrast calculation part 40, image data representing a focus area is inputted from the digital signal processor 8. The focus area is a region on the obtained image, and a region subject to evaluation value calculation.

Information designating the focus area is written, for example, in the internal memory 50 of the digital camera 100 as a preset value. The preset value includes information about the position and the shape of the focus area on the obtained image (in the information of the shape, information of a size is included). In this case, the preset value is read from the internal memory 50 by the micro computer 3 and temporarily stored in the RAM 3a of the micro computer 3, and at the same time, the preset value is conveyed to the digital signal processor 8. The digital signal processor 8 determines the focus area based on the preset value.

Figure 9B:
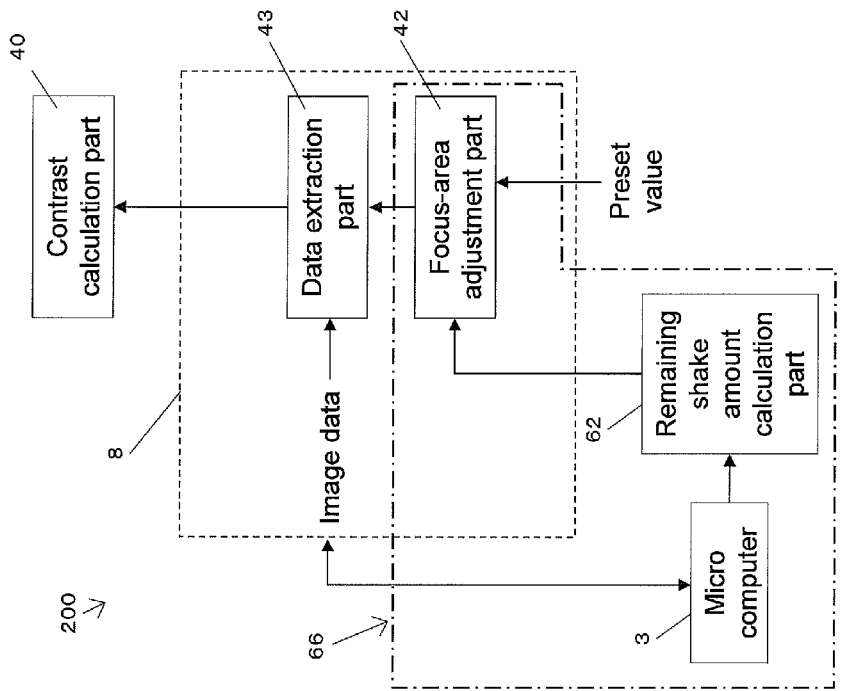
FIG. 9B is a block diagram showing a part of the configuration of the digital signal processor 8 in a digital camera 200.
Figure 9A:
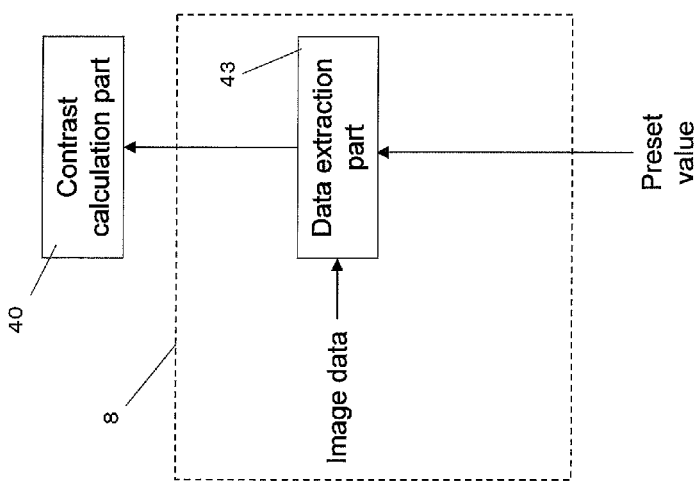
FIG. 9A is a block diagram showing a part of the configuration of a digital signal processor 8 in the digital camera 100.

A data extraction part 43 included in the digital signal processor 8 extracts image data representing the focus area from the image data representing the obtained image (FIG. 9A). The contrast calculation part 40 calculates the evaluation value by using the image data extracted by the data extraction part 43, and outputs the calculated evaluation value to the focus lens drive controller 41.

To the focus lens drive controller 41, information about the position in the optical axis direction of the first lens group L1 is conveyed. The focus lens drive controller 41 obtains the evaluation value corresponding to the position of the first lens group L1 from the contrast calculation part 40 while moving the first lens group L1 in a predetermined movable range. Upon detection of a position at which the evaluation value peaks, i.e., the focal position, the focus lens drive controller 41 moves the first lens group L1 to the focal position and ends the contrast AF processing.

Angular Velocity Sensor

The angular velocity sensor 17 (an example of a shake amount detection part) is a sensor for detecting shake of the entire digital camera 100 (an example of a device itself) caused by a user's hand movement or other vibration, and includes a yawing-direction angular velocity sensor 17x and a pitching-direction angular velocity sensor 17y.

The yawing-direction angular velocity sensor 17x detects shake in a yawing direction (described later), and outputs a positive or negative signal based on shake on either side of the yawing direction with reference to output in a state where the digital camera 100 is motionless. Likewise, the pitching-direction angular velocity sensor 17y detects shake in a pitching direction (described later), and outputs a positive or negative signal based on shake on either side of the pitching direction. The outputted signal is processed in the central controller 2. Specifically, the signal outputted from the angular velocity sensor 17 (an example of a detected shake amount) is converted into a digital signal by the A/D converters 18x and 18y, and converted into a signal representing a shake angle in the micro computer 3. The signal which represents the shake angle and is generated in the micro computer 3 is outputted to the shake correction part 15 and the remaining shake amount calculation part 62.

Shake Correction Part

The shake correction part 15 includes: a shake correction mechanism 20 and a movement controller 15a for controlling the shake correction mechanism 20, and decreases the influence exerted on the obtained image by the shake of the digital camera 100.

As shown in FIG. 1, the movement controller 15a includes: a position detection part 16 (an example of a motion detection unit) for detecting the position of the second lens group L2 on a plane vertical to the optical axis direction; a yawing drive controller 15x (an example of a drive unit) for controlling drive of the second lens group L2 in the yawing direction; and a pitching drive controller 15y (an example of a drive part) for controlling drive of the second lens group L2 in the pitching direction.

The yawing drive controller 15x and the pitching drive controller 15y transmit a signal for driving the second lens group L2 to the shake correction mechanism 20, based on the control signal from the micro computer 3. At this time, a drive amount of the second lens group L2 is determined so that the drive amount is a direction and a magnitude to substantially cancel out the displacement of the subject image on the CCD 4 caused according to the shake of the digital camera 100.

The shake correction mechanism 20 moves a second lens group holding frame 21 (that is, the second lens group L2), described later, within a plane vertical to the optical axis direction, based on the signal from the movement controller 15a.

The position detection unit 16 includes a light-emitting element 30 and light-receiving element 31 which are described later, and detects the position of the second lens group L2. The position information of the second lens group L2 detected by the position detection part 16 is conveyed to the yawing drive controller 15x, the pitching drive controller 15y, and the central controller 2.

In the central controller 2, the micro computer 3 calculates a movement amount of the second lens group L2 (where the normal position is used as a reference), based on the information from the position detection part 16. Moreover, the micro computer 3 calculates a correction angle (described later) from the movement amount of the second lens group L2.

Figure 2:
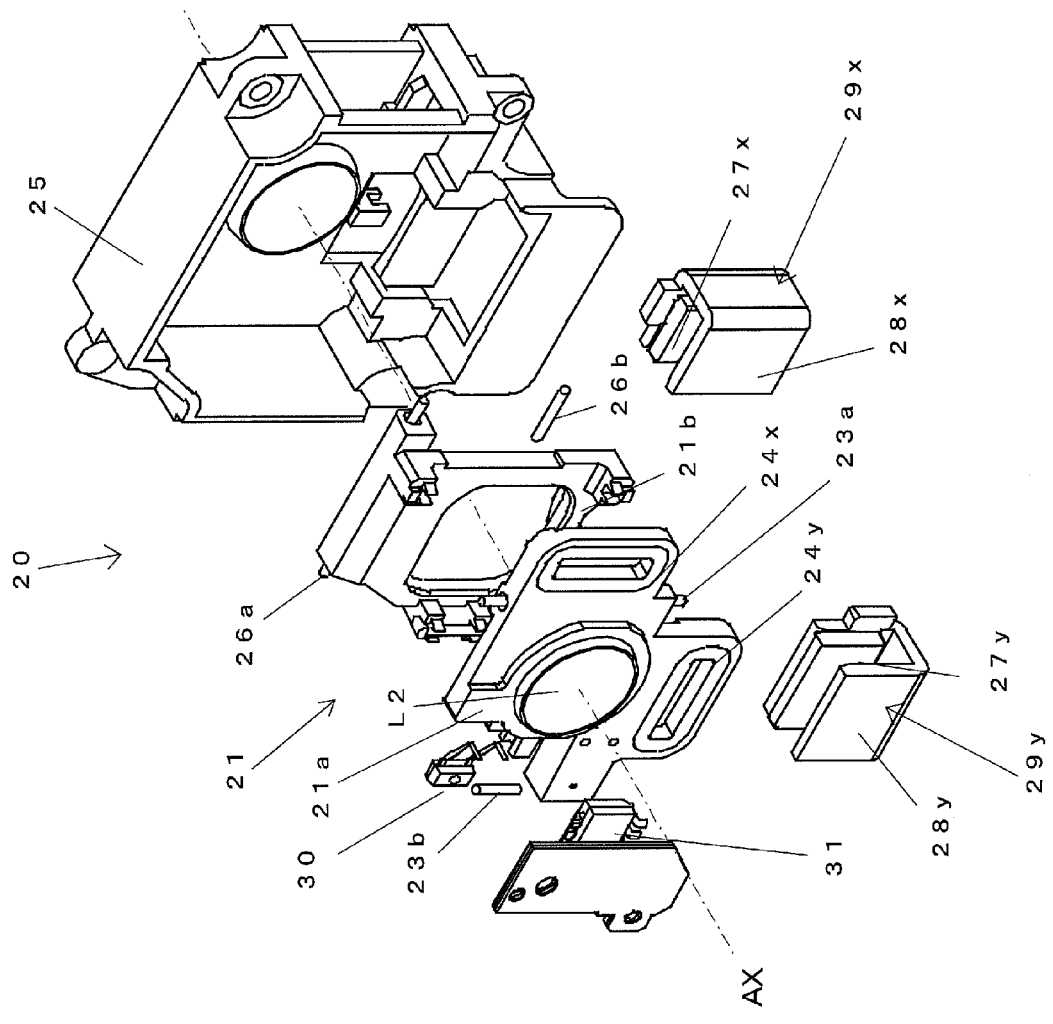
FIG. 2 is an exploded perspective view of a shake correction mechanism 20.

At this time, the configuration of the shake correction mechanism 20 will be explained by using FIG. 2. In FIG. 2, a three-dimensional orthogonal coordinate axis is set so that a Z-axis direction is parallel to the optical axis direction. In this coordinate axis, the pitching means rotation around an X-axis, and the yawing means rotation around a Y-axis. That is, the pitching direction is a Y-axis direction in FIG. 2, and the yawing direction is an X-axis direction in FIG. 2.

As shown in FIG. 2, the shake correction mechanism 20 is provided mainly with: the second lens group holding frame 21; a fixed frame 25; a yawing-use actuator 29x; a pitching-use actuator 29y; the light-emitting element 30; and the light-receiving element 31.

The second lens group holding frame 21 (an example of a movable member) includes a pitching holding frame 21a movable in the X-axis direction and Y-axis direction by the control of the shake correction part 15, and a yawing holding frame 21b. The second lens group L2 is fixed to the pitching holding frame 21a and moves together with the pitching holding frame 21a.

The pitching holding frame 21a includes coils 24x and 24y. The pitching holding frame 21a is supported by the yawing holding frame 21b via pitching shafts 23a and 23b disposed in parallel to the Y-axis direction. Thus, the pitching holding frame 21a is guided by the pitching shafts 23a and 23b, and is able to move in the Y-axis direction relative to the yawing holding frame 21b.

As a result of currents being passed by the control of the yawing drive controller 15x and the pitching drive controller 15y, respectively, a magnetic field occurs in the coils 24x and 24y. By an electromagnetic force between the magnetic field occurring in the coil 24x and the magnetic field formed by a magnet 27x (described later), the pitching holding frame 21a is driven in the X-axis direction. Likewise, by an electromagnetic force between the magnetic field occurring in the coil 24y and the magnetic field formed by a magnet 2'7y (described later), the pitching holding frame 21a is driven in the Y-axis direction.

The yawing holding frame 21b is supported by the fixed frame 25 via yawing shafts 26a and 26b disposed in parallel to the X-axis direction. Thus, the yawing holding frame 21b is guided by the yawing shaft 26a and 26b, and is movable in the X-axis direction relative to the fixed frame 25.

The yawing-use actuator 29x is held by the fixed frame 25, and includes the magnet 27x and a yoke 28x for adjusting a direction of the magnetic field formed by the magnet 27x. The pitching-use actuator 29y is held by the fixed frame 25, and includes the magnet 2'7y and a yoke 28y for adjusting the direction of the magnetic field formed by the magnet 27y.

The light-emitting element 30 is an element emitting projection light toward the light-receiving element 31, fixed to the pitching holding frame 21a, and moves together with the pitching holding frame 21a.

The light-receiving element 31 is, for example, a photodiode and receives the projection light from the light-emitting element 30. The light-receiving element 31 is fixed to the fixed frame 25 and detects the position of the light-emitting element 30 on an X-Y plane (i.e., a plane vertical to the optical axis direction), based on the position at which the projection light has been received. In this way, when the position of the light-emitting element 30 is detected, the position of the second lens group L2 is detected. As described above, the light-emitting element 30 and the light-receiving element 31 are included in the position detection part 16.

Remaining Shake Amount Calculation Part and Variation-width Calculation Part

The remaining shake amount calculation part 62 calculates a remaining shake amount (described later) by evaluating a difference between a shake angle and a correction angle. Moreover, the remaining shake amount calculation part 62 transmits the detected remaining shake amount to the image memory 9. The remaining shake amount is stored in the image memory 9 while being associated with the corresponding obtained image.

The variation-width calculation part 64 obtains the remaining shake amount from the remaining shake amount calculation part 62, and calculates a variation value of the remaining shake amount within a predetermined time period by monitoring a maximum value and a minimum value of the remaining shake amount.

1.2 Operation of Digital Camera

An operation of the digital camera 100 during photography will be explained by using drawings.

Shake Correction

Firstly, the shake correction will be explained. Hereinafter, similarly to FIG. 2, the X-axis direction is the yawing direction and the Y-axis direction is the pitching direction. Moreover, the plane vertical to the optical axis direction is also referred to as "X-Y plane".

As shown in FIG. 1, a signal outputted from the angular velocity sensor 17 is subjected to processing such as filtering and gain adjustment by an amplifier, and then, converted into a digital signal in the A/D converters 18x and 18y, and applied to the micro computer 3. In the micro computer 3, the signal outputted from the A/D converters 18x and 18y is subjected to processing such as filtering, integration processing, phase compensation, gain adjustment, and clip processing, and converted into a signal representing the shake angle.

Subsequently, in the micro computer 3, a drive amount of the second lens group L2, which is required for the shake correction, is calculated based on the signal representing the shake angle. Further, based on the calculated drive amount, a control signal for instructing movement of the second lens group holding frame 21 is generated.

Specifically, based on the signal from the angular velocity sensor 17, shake angles of the optical axis AX in the yawing direction and the pitching direction are calculated. Subsequently, drive amounts in the yawing direction (X-axis direction) and the pitching direction (Y-axis direction) of the second lens group L2 are determined so that the shake angles in the respective directions are substantially canceled out. Based on the drive amounts, the micro computer 3 generates a control signal for instructing an orientation and a distance in which the yawing holding frame 21b is moved in the X-axis direction and an orientation and a distance in which the pitching holding frame 21a is moved in the Y-axis direction.

The generated control signal is outputted via the D/A converters 19x and 19y to the movement controller 15a (more particularly, the yawing drive controller 15x and the pitching drive controller 15y) from the micro computer 3. The yawing drive controller 15x and the pitching drive controller 15y moves the second lens group L2 on the X-Y plane based on the control signal outputted from the micro computer 3.

When the second lens group L2 is thus moved, an effect in which the optical axis AX is substantially inclined can be obtained. As a result, the inclination of the optical axis AX caused by the shake of the digital camera 100 is substantially modified and an image turbulence is corrected. That is, when the second lens group L2 moves, subject image's position on the CCD 4 moves, and thus, the displacement of the subject image on the CCD 4, which is generated by the shake, is approximately canceled out.

The position detection part 16, together with the movement controller 15a, forms a feedback control loop for controlling the position of the second lens group L2. In the control loop, drive of the second lens group L2 by the movement controller 15a and detection of the position of the second lens group L2 by the position detection part 16 are repeated. More particularly, the position of the second lens group L2 on the X-Y plane is detected by the position detection part 16, and information representing the detected position is conveyed to the movement controller 15a. Based on the information conveyed from the position detection part 16, the movement controller 15a determines whether or not the second lens group L2 is driven by the drive amount instructed by the control signal applied from the micro computer 3. When determining that the second lens group L2 needs to be further moved, the movement controller 15a moves the second lens group L2.

Thus, the detection of the position of the second lens group L2 and the movement of the second lens group L2 are repeated. Then, when determining that the second lens group L2 is moved by the drive amount instructed by the control signal applied from the micro computer 3, the movement controller 15a ends the shake correction.

The position detection part 16 detects the position of the second lens group L obtained when the shake correction is ended. In other words, the position detection part 16 detects a movement amount (an example of a detected movement amount) from the normal position of the second lens group 12. The detected position information of the second lens group L2 is transmitted to the micro computer 3 via the A/D converter 61. The micro computer 3 converts the movement amount from the normal position of the second lens group L2 into an inclination angle of the optical axis AX, based on the position information of the second lens group L2 obtained when the shake correction is ended, and calculates the inclination angle of the optical axis AX as the correction angle. The signal representing the correction angle is transmitted to the remaining shake amount calculation part 62.

Remaining Shake Amount Calculation

Subsequently, the calculation of the remaining shake amount in the digital camera 100 will be explained.

The remaining shake amount is a two-dimensional vector amount on the obtained image, and represents influence exerted by the shake of the digital camera 100 on the obtained image. Hereinafter, the two-dimensional vector amount is expressed by using two components, i.e., an X component and a Y component. Moreover, similarly to the three-dimensional coordinate axis in FIG. 2, the X component is a component corresponding to the X-axis direction in FIG. 2 and the Y component is a component corresponding to the Y-axis direction in FIG. 2. Moreover, in the first embodiment, the X component and the Y component are represented in pixel number.

The remaining shake amount is calculated by converting a remaining shake angle into the two-dimensional vector amount on the obtained image. At this time, the remaining shake angle is a difference between the shake angle of the digital camera 100 and the above-described correction angle.

More particularly, as described above, the shake angles in the X-axis direction (yawing direction) and the Y-axis direction (pitching direction) of the digital camera 100 are calculated from the output of the angular velocity sensor 17. Moreover, based on the output of the position detection part 16, the correction angles in the X-axis direction and the Y-axis direction are calculated. The remaining shake angle is calculated by calculating a difference between the shake angle and the correction angle in the respective X-axis direction and Y-axis direction. Further, the remaining shake angle is converted into the remaining shake amount based on the effective pixel number of the CCD 4 and the focal length during imaging.

For example, the pixel of the CCD 4 is a square pixel, D [pixel number] denotes a diagonal length of the CCD 4, and f [mm] denotes a focal length in terms of 35-mm film. Moreover, $\Phi x$ [deg] denotes the remaining shake angle in the X-axis direction (remaining shake angle around the Y-axis) and $\Phi y$ [deg] denotes the remaining shake angle in the Y-axis direction (remaining shake angle around the X-axis).

In this case, an X component Rx [pixel number] of the remaining shake amount is calculated by using Equation (1).

$$Rx = f \tan(\Phi x) \cdot D/(36^2 + 24^2)^{0.5} \tag{1}$$

Moreover, a Y component Ry [pixel number] of the remaining shake amount is calculated by using Equation (2).

$$Ry = f \tan(\Phi y) \cdot D/(36^2 + 24^2)^{0.5} \tag{2}$$

Hereinafter, specific processing of calculating the remaining shake amount will be explained by using FIG. 1.

In the micro computer 3, various processing such as filtering, integration processing, phase compensation, gain adjustment, and clip processing are performed on the output signal of the angular velocity sensor 17 fetched via the A/D converters 18x and 18y. When these processing are performed, the micro computer 3 calculates the shake angles in the pitching direction and the yawing direction of the digital camera 100. As described above, the correction angle is calculated in the micro computer 3. The correction angles in the pitching direction and the yawing direction are calculated by performing processing such as filtering and gain adjustment on the output signal of the position detection part 16 fetched via the A/D converter 61. In the micro computer 6, the focal length (i.e., angle of field) during photography is evaluated by using the information representing the position in the optical axis direction of the third lens group L3 which is the zoom lens group in the micro computer 3. The information representing the position in the optical axis direction of the third lens group L3 in the focal state is detected by the focus lens drive controller 41, and transmitted to the micro computer 3.

The shake angle and the correction angle in the pitching direction and the yawing direction evaluated by the above processing, the focal length, and the effective pixel number of the CCD 4 previously stored in the internal memory 50 are outputted from the micro computer 3 to the remaining shake amount calculation part 62. The remaining shake amount calculation part 62 calculates the remaining shake angle in the pitching direction and the yawing direction by calculating a difference between the shake angle and the correction angle.

Further, the remaining shake amount calculation part 62 calculates the remaining shake amount from the remaining shake angle based on the relations of Equation (1) and Equation (2).

Thus, the remaining shake angle is converted into the two-dimensional vector amount on the obtained image, and the remaining shake amount is calculated. As described above, the remaining shake angle is a difference between the shake angle of the digital camera 100 and the correction angle. Moreover, the correction angle represents a so-called optical shake correction by the shake correction part 15. That is, the remaining shake angle is a shake angle that is not canceled out by the optical shake correction. Thus, the remaining shake amount represents the influence of the shake that is not canceled out by the optical shake correction as a displacement of the subject on the two-dimensional image.

Moreover, in the variation-width calculation part 64 the maximum value and the minimum value of the remaining shake amount within the exposure time are monitored. The variation-width calculation part 64 calculates a difference between the detected maximum value and minimum value so as to calculate a remaining shake PP value (an example of a variation width) within the exposure time (an example of a predetermined time).

For example, the variation-width calculation part 64 is provided with a memory (not shown) in which the minimum value and the maximum value of the remaining shake amount are respectively stored. In this case, the remaining shake amount calculated in the remaining shake amount calculation part 62 is compared with the minimum value and the maximum value stored in the memory. When the calculated remaining shake amount is smaller than the minimum value stored in the memory, the calculated remaining shake amount is then stored in the memory instead as a new minimum value. Likewise, when the calculated remaining shake amount is larger than the maximum value stored in the memory, the calculated remaining shake amount is then stored in the memory instead as a new maximum value. In this way, the variation of the remaining shake amount within the exposure time is monitored, and when the difference between the maximum value and the minimum value stored in the memory is calculated, the remaining shake PP value is calculated. It is noted that the variation-width calculation part 64 may be a part of the remaining shake amount calculation part 62.

When imaging is performed, the remaining shake amount calculation part 62 outputs the remaining shake amount obtained at the time of starting the exposure, to the image memory 9. Moreover, the remaining shake amount calculation part 62 obtains the remaining shake PP value from the variance width calculation part 64 at a time point at which one exposure is ended and outputs the remaining shake PP value to the image memory 9. In the image memory 9, the obtained image, the remaining shake amount obtained at the time of starting the exposure, and the remaining shake PP value are stored in a mutually associated state.

The processing of calculating the remaining shake amount is executed for a plurality of times in a certain cycle within the exposure time. Similar to the operation of the shake correction part 15, the cycle during which the remaining shake amount is calculated is sufficiently short relative to the exposure time. For example, the calculation of the remaining shake amount is executed at a frequency of several hundred times or more per second (several hundreds of Hz or more).

Photography Operation of Digital Camera

Subsequently, a photography operation of the digital camera 100 will be explained.

Firstly, a photography mode will be explained. In the digital camera 100, photography modes can be selected. A user is capable of selecting a normal photography mode or a continuous shots synthesis mode by operating the photography mode switch 36. In the normal photography mode, photography is ended in single imaging processing. In the continuous shots synthesis mode, multiple imaging processing operations are performed in single photography, and continuous shots formed by a plurality of obtained images are obtained. In the continuous shots synthesis mode, a single synthesized image is generated from the continuous shots.

The photography operation of the digital camera 100 will be explained along a flowchart in FIG. 4, below.

When the user applies power to the digital camera 100 in the photography mode, the digital camera 100 becomes in a standby state where it is possible to start photographing. In the standby state, the micro computer 3 determines whether or not the release button 35 is half-depressed (S101).

When the release button 35 is half-depressed, the shake correction part 15 starts the above-described shake correction. Moreover, the remaining shake amount calculation part 62 starts calculating the remaining shake amount (S102).

Subsequently, the contrast AF is executed (S103). At step S103, the electrical signal is read from the CCD 4 at certain time intervals, and in the imaging processor 90, the obtained image is obtained from the electrical signal. The digital signal processor 8 extracts the image data representing the focus area from the image data representing the obtained image, and transmits the image data representing the focus area to the contrast calculation part 40. Based on the image data representing the focus area, the contrast AF is executed by the contrast calculation part 40 and the focus lens drive controller 41.

Subsequently, the micro computer 3 determines whether or not the release button 35 is fully depressed (S104).

When it is not detected that the release button 35 is fully depressed at step S104, the process proceeds to step S105 to determine whether or not the release button 35 is half-depressed. When the release button 35 is half-depressed at step S105, the process returns to step S104 again to determine whether or not the release button 35 is fully depressed. When the release button 35 is not half-depressed at step S105, the process proceeds to step S112. At step S112, the photography operation is ended. That is, at step S112, the shake correction and the calculation of the remaining shake amount are ended, and the photography is ended.

When it is detected that the release button 35 is fully depressed at step S104, the imaging processing is executed in the imaging unit (S106). At step S106, the shutter 95 is opened/closed, and the CCD 4 is exposed in a predetermined exposure time. When the exposure is ended, the electrical signal is read from the CCD 4. The read electrical signal is processed in the imaging processor 90, and the obtained image is obtained. The image data representing the obtained image is stored in the image memory 9. Moreover, the remaining shake amount obtained at the time of starting the exposure and the remaining shake PP value within the exposure time are stored in the image memory 9 while being associated with the obtained image.

Subsequently, the micro computer 3 determines whether or not the selected photography mode is the continuous shots synthesis mode (S107). When it is determined that the selected photography mode is not the continuous shots synthesis mode at step S107, i.e., when the selected photography mode is the normal photography mode, the process proceeds to step S112 to end the photography. When it is determined that the selected photography mode is the continuous shots synthesis mode at step S107, the second lens group L2 is centered (S108). The centering is process for returning the position of the second lens group L2 to the center of the movable range, i.e., the normal position. When the control signal instructing the centering is applied from the micro computer 3, the movement controller 15a moves the pitching holding frame 21a and the yawing holding frame 21b of the shake correction mechanism 20 and executes the centering.

Subsequently, the imaging processing is executed again (S109). The processing here is the same as that at step S106.

Subsequently, the micro computer 3 determines whether or not a predetermined number of times of imaging operations are ended (S110). The number of times of imaging operation in the continuous shots synthesis mode (i.e., the number of continuous shots) is determined taking into consideration several factors. For example, a capacity of the image memory 9 is taken into consideration. Moreover, a total of required exposure times (total of exposure times of each obtained image configuring the continuous shots), a time required for processing of generating a synthesized image, etc., are taken into consideration. In this case, as one example, four imaging operations are performed per single photography (it should be noted that the number of times of the imaging operations per single photography is not limited to four).

When the predetermined number of times of imaging operations is not ended at step S110, the process returns to step S108 to execute the centering again. Further, at step S109, the imaging processing is executed.

At this time, the relation between the shake angle and the correction angle in the continuous shots synthesis mode will be explained by using FIG. 7 and FIG. 8. It is noted that angles such as the shake angle and the correction angle are represented by using the component in the pitching direction (Y-axis direction) and the component in the yawing direction (X-axis direction). For the sake of ease of explanation, the relation is explained by using either one of the pitching direction or the yawing direction only. For example, the shake angle and the correction angle in FIG. 7 represent the component in the yawing direction (X-axis direction).

Figure 7:
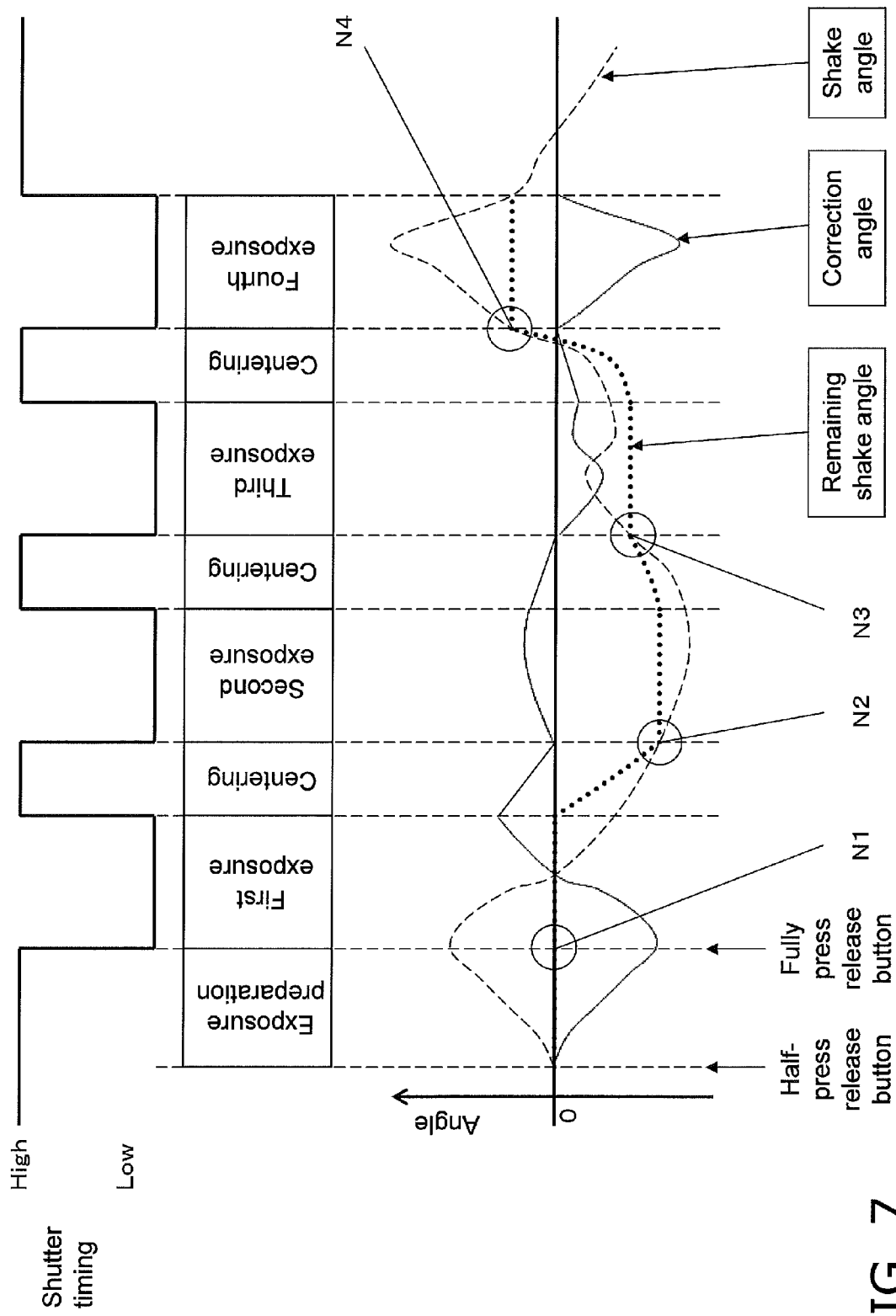
FIG. 7 is a schematic diagram showing a relation between a shake angle and a correction angle when centering is executed.

FIG. 7 is a timing chart showing the relation between the shake angle and the correction angle when the centering is executed. As shown in an upper part in FIG. 7, a shutter 95 is opened at a timing at which a shutter timing signal falls from High to Low, and the exposure is started. The shutter 95 is closed at a timing at which the shutter timing signal rises from Low to High, the exposure is ended. The operation from the opening of the shutter 95 to the closing of the shutter 95 is the exposure processing. The exposure processing is a part of the imaging processing. In this case, four exposure processing operations are performed continuously.

As shown in a middle part in FIG. 7, in the digital camera 100, the exposure processing and the centering are repeated. When the release button 35 is half-depressed, the shake correction and the calculation of the remaining shake amount are started, as described above. When the release button 35 is fully depressed after the contrast AF is executed, first exposure processing (first exposure) is performed. When the first exposure is ended, the centering is executed. When the centering is ended, second exposure processing (second exposure) is performed. Likewise, third exposure processing (third exposure) and fourth exposure processing (fourth exposure) are executed. Moreover, as shown in a lower part in FIG. 7, the shake correction is performed at the correction angle (actual line) according to the shake angle (broken line), and the remaining shake angle (dotted line) is calculated. The remaining shake angle is calculated by calculating the difference between the shake angle and the correction angle.

When the centering is performed, the position of the second lens group L2 is returned to the normal position. Thus, in the second exposure processing or onward, the exposure is performed in the sate where the remaining shake angle occurs. As described above, the remaining shake angle is converted into the remaining shake amount. The remaining shake amount represents the displacement of the subject on the obtained image. Thus, in the obtained images obtained in the second to fourth exposures, the subject is displaced according to the remaining shake angle at a time point at which the exposure processing is started.

As shown in FIG. 7, a remaining shake angle N1 in the first exposure is "0" because no remaining shake amount occurs. In the second exposure, a remaining shake angle N2 occurs. Likewise, in the third exposure, a remaining shake angle N3 is generated, and in the fourth exposure, a remaining shake angle N4 occurs. Therefore, when a comparison is made between the obtained image obtained in the first exposure and those obtained in the other exposures, deviation corresponding to the remaining shake angles N2 to N4 occurs at the positions of the subject on the obtained images obtained in the second to fourth exposures.

In FIG. 7, the shake correction is effectively operated, and thus, the remaining shake angle is not fluctuated within the exposure time. Therefore, there is no shake influence on the obtained image. On the other hand, during a period from a time point at which the exposure processing is ended to a start of subsequent exposure processing, the centering is executed, and thus, the shake correction is not effectively operated. Thus, the remaining shake angle is fluctuated. However, the CCD 4 is not exposed, and thus, the influence of the variation of the remaining shake angle is not appeared on the obtained image. It is noted that by the remaining shake angle occurring as a result of the centering, the positions of the subject differ in the four obtained images (continuous shots).

Figure 8:
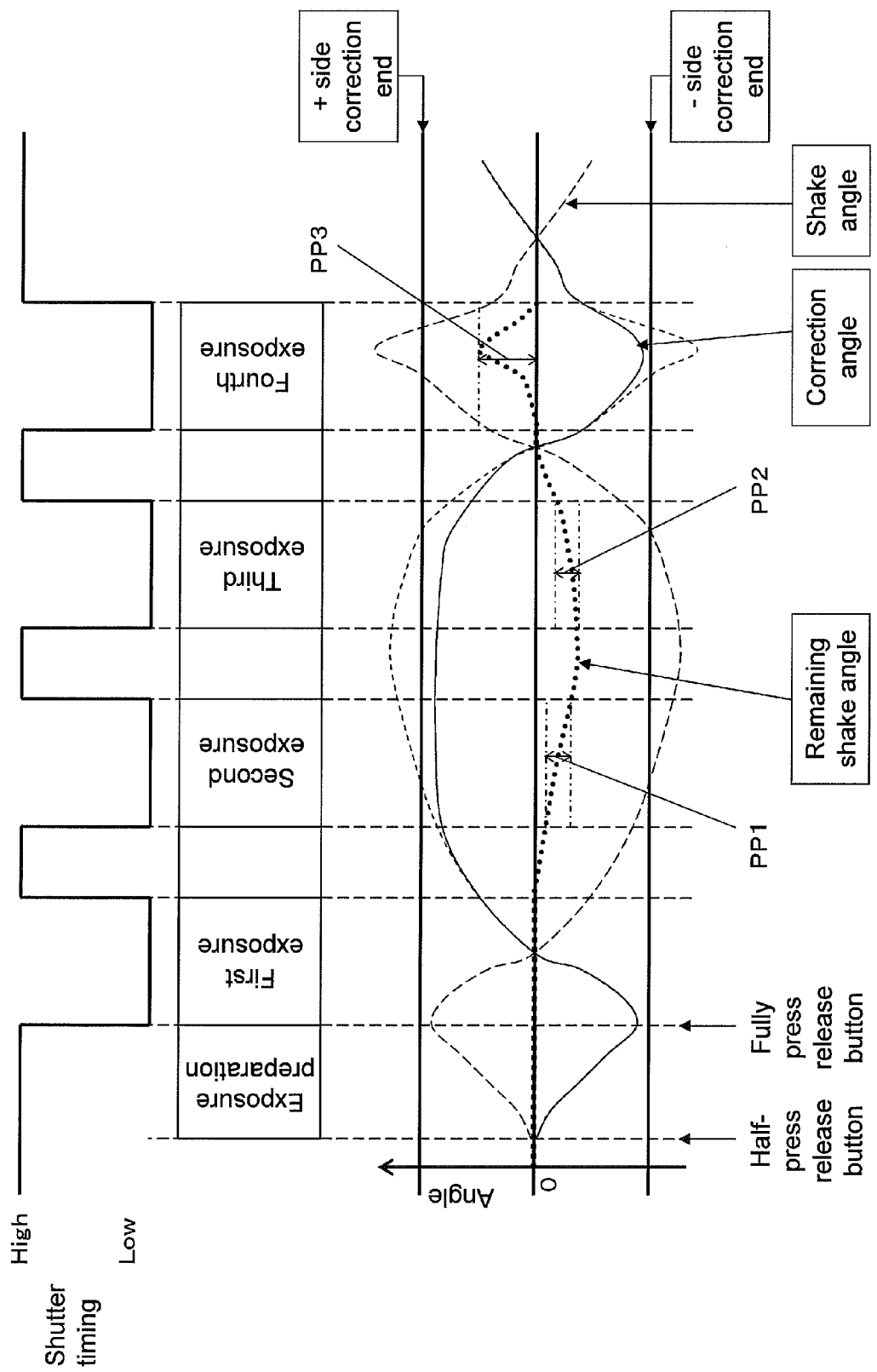
FIG. 8 is a schematic diagram showing a relation between the shake angle and the correction angle when the centering is not executed.

On the other hand, FIG. 8 shows a case where the centering is omitted. In this way, it is possible to omit the centering. It is noted that similarly to the case in FIG. 7, the shake angle and the correction angle in FIG. 8 represent the component in the X-axis direction.

As shown in a lower part in FIG. 8, the correction angle is restricted in a certain range. This is because there is a limit as to a range over which the second lens group holding frame 21 of the shake correction mechanism 20 (i.e., the pitching holding frame 21a and the yawing holding frame 21b) can move. Such a movement range limit is called a correction end, below. For example, in FIG. 8, the movement of the yawing holding frame 21b in the X-axis direction is limited to a range from a − (minus) side correction end to a + (plus) side correction end. Thus, when a shake angle having a magnitude exceeding the correction end occurs, it is not completely possible to cancel out the shake angle even when the shake correction normally operates.

When the shake angle is not canceled out, the shake angle not canceled out is the remaining shake angle. In FIG. 8, the shake angle exceeds the correction end in each of the second to fourth exposures, and thus, the remaining shake angle occurs. Therefore, similarly to the case in FIG. 7, when a comparison is made between the obtained image obtained in the first exposure and those obtained in the other exposures, deviation corresponding to the remaining shake angles occurs at the positions of the subject on the obtained images obtained in the second to fourth exposures.

Moreover, in the second to fourth exposures, the remaining shake angle is fluctuated within each of the exposure times. As described above, based on the variation of the remaining shake angle within each of the exposure times, the remaining shake PP value is calculated. FIG. 8 shows a variation region of the remaining shake angle within the exposure time by a dashed line. Moreover, the variation values of the remaining shake angle within the exposure times of the second, third, and fourth exposures are PP1, PP2, and PP3, respectively. Thus, when the correction angle is limited by the correction end, the remaining shake angle within the exposure time may probably be fluctuated greatly. The variation of the remaining shake angle within the exposure time influences the obtained image, and, for example, image blur occurs.

As described above, the remaining shake amount and the remaining shake PP value at the time of starting each exposure in the first to fourth exposures are stored in the image memory 9 while being associated with the obtained image obtained in each of the exposures.

Now, returning to the flowchart in FIG. 4 again, the flow of the photography operation will be explained. When it is determined at step S110 that a predetermined number of times of imaging operations are ended, image synthesizing processing is executed (S111). The continuous shots processor 60 reads out the continuous shots from the image memory 9, and synthesizes the continuous shots by averaging so as to generate a synthesized image.

When the generation of the synthesized image is ended, the process proceeds to step S112. At step S112, the shake correction and the calculation of the remaining shake amount are ended. Thereafter, the photography is ended, the digital camera 100 returns to the standby state. It is noted that when an instruction for ending the photography mode is inputted by the user, or when an instruction for turning off the power supply of the digital camera 100 is inputted, the processing flow of the photography operation is interrupted and the photography operation is ended after predetermined ending processing.

Image Synthesizing Processing

Subsequently, the above-described image synthesizing processing at step S111 will be explained by using a flowchart in FIG. 5, and FIG. 3 and FIGS. 6A to 6C. In the image synthesizing processing at step S111, a motion vector is calculated by using a template matching. Moreover, the continuous shots are overlaid by using the motion vector, and the synthesized image is generated.

When it is determined at the above-described step S110 that the predetermined number of times of imaging operations are ended, the process proceeds to step S201. At step S201, the reading part 60a reads a reference image 70 (an example of a photographed image) from the image memory 9. The reference image 70 is, for example, an obtained image imaged at the earliest timing, out of the continuous shots. In this case, the reference image 70 is the obtained image imaged in the first exposure in FIG. 7 or FIG. 8. The reading part 60a transmits the image data representing the reference image 70 to the search region determination part 60b. In the first embodiment, the size of the reference image 70 is the same as that of the obtained image; however, the size of the reference image 70 may differ from that of the obtained image. For example, the reference image 70 may be generated by cutting a part of the obtained image. In this case, the size of the cut reference image 70 is smaller than that of the obtained image. In this case, the size of the image represents the size of the image region, and is expressed by, for example, the pixel number. Moreover, cutting a part of the obtained image means the generation of an image by using only a part of pixel data, out of the pixel data configuring the obtained image.

Subsequently, the search region determination part 60b sets a template block T based on the read continuous shots (S202).

Figure 6A:
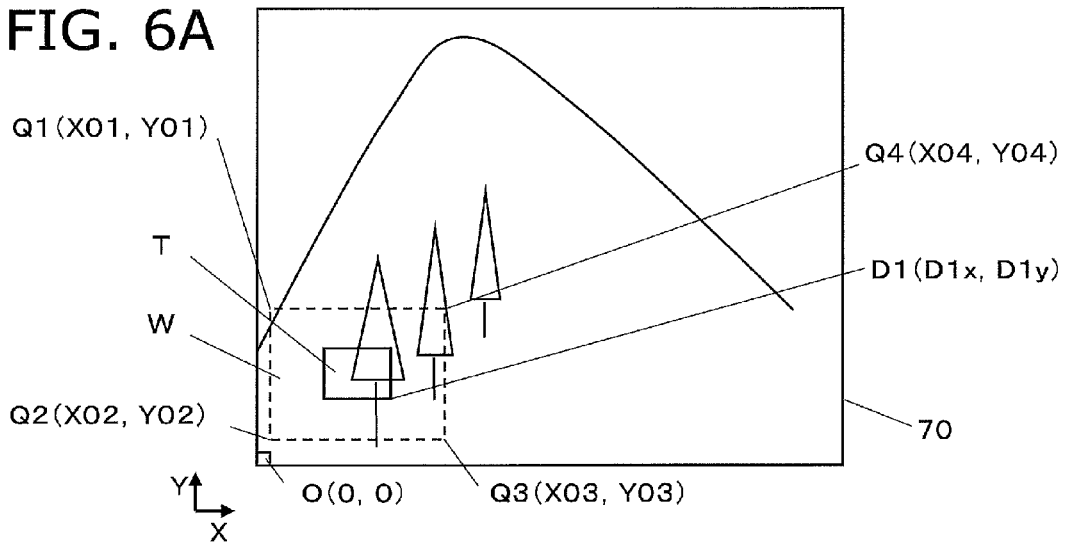
FIG. 6A is a concept view showing a method of detecting a motion vector VM.

As shown in FIG. 6A, at step S202, the search region determination part 60b sets the template block T within the reference image 70. The position and the shape of the template block T in the reference image 70 are previously determined. For example, information about the position and the shape of the template block T is previously stored in the internal memory 50 of the digital camera 100. In this case, the information about the position and the shape of the template block T is read from the internal memory 50 by the micro computer 3, and transmitted to the memory part 60f. The memory part 60f temporarily stores the information about the position and the shape of the template block T. The search region determination part 60b sets the template block T within the reference image 70 based on the information about the template block T stored in the memory part 60f. It is noted that the information about the shape of the template block T includes information about the size of the template block T.

The template block T is a template used as a determination reference in the template matching (described later). The template block T may suffice if the template block T has a certain level of characteristic to be used for detecting a matching region M (described later), and thus, the template block T can be made smaller than a region of a reference image 70. For example, the size of the template block T can be made smaller than half the size of the reference image 70. It is noted that a case where there is only one template block T is explained below, however, a plurality of template blocks T may be arranged.

The search region determination part 60b extracts the image data representing the template block T from the image data representing the reference image 70. The image data representing the template block T is temporarily stored in the memory part 60f. The image data representing the template block T is used as reference information to detect a matching region M (an example of a characteristic region) that matches in characteristic with the template block T from a search region I (an example of a first image region), which is described later.

When setting the template block T is ended at step S202, the process proceeds to step S203. When the template block T is set to the reference image 70, the reading part 60a reads a next obtained image from the continuous shots stored in the image memory 9 (S203). The read obtained image is set to a target image 71. Moreover, the reading part 60a reads the remaining shake amount and the remaining shake PP value corresponding to the read obtained image.

The order in which the obtained image is read in the image synthesizing processing, for example, is the order of an imaging timing. In this case, the obtained image imaged in the second exposure in FIG. 7 is read next to the reference image 70 (the obtained image imaged in the first exposure), and set to the target image 71. It is noted that when the processing on the obtained image imaged in the second exposure is ended, subsequently, the obtained image imaged in the third exposure is read, and set to the target image 71. Likewise, the obtained image imaged in the fourth exposure is processed. In other words, the synthesized image is generated by using a plurality of image signals obtained at different timings.

The reading part 60a compares the remaining shake PP value corresponding to the target image 71 with a predetermined limit variation value (an example of a first upper limit) to determine whether or not the remaining shake PP value is equal to or less than the limit variation value (S204). When the remaining shake PP value is larger than the limit variation value, the process proceeds to step S208.

When the process proceeds to step S208, the obtained image set to the target image 71 by the reading part 60a at this time is not used for the generation of the synthesized image. When the remaining shake PP value is equal to or less than the limit variation value, the process proceeds to step S205. In this way, when the remaining shake PP value exceeds a predetermined limit variation value, the corresponding obtained image is determined to be influenced by the shake and not used for the synthesizing processing. Thereby, the shake correction mechanism 20 reaches the correction end, and even when the remaining shake angle occurs, the use of an image inappropriate for the synthesizing processing can be avoided, thus it is possible to reduce a quality deterioration of the synthesized image.

When it is determined at step S204 that the remaining shake PP value is equal to or less than the limit variation value, the search region determination part 60b sets the search region I to within the target image 71 (S205).

Figure 6B:
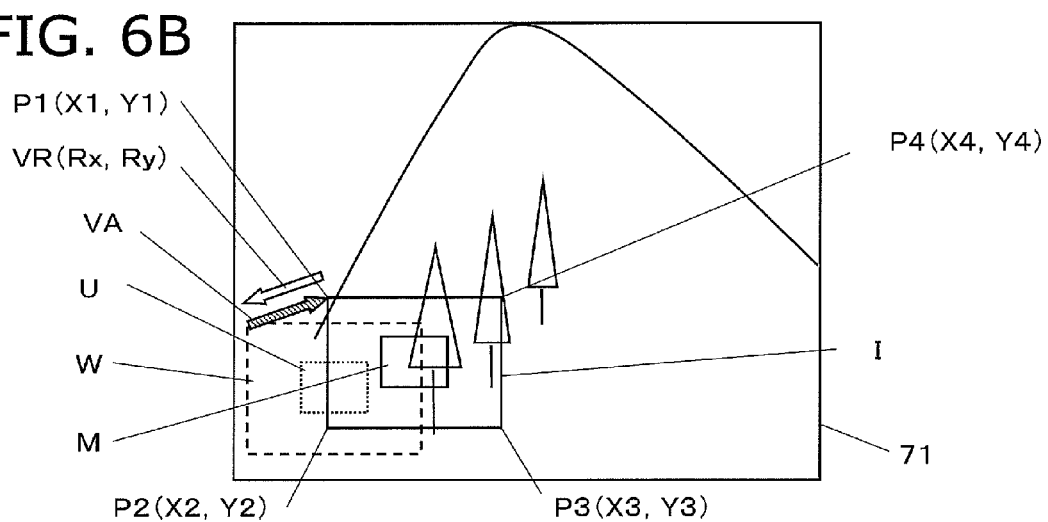
FIG. 6B is a concept view showing a method of detecting a motion vector VM.

As shown in FIG. 6B, the search region determination part 60b sets a reference region W to within the target image 71 as a preparation for setting the search region I. The reference region W is set by using a referencing block U as a reference. FIG. 6B shows the referencing block U within the target image 71. The position and the shape of the referencing block U in the target image 71 are completely the same as the position and the shape of the template block T in the reference image 70. In the first embodiment, the rectangular reference region W is set so that the referencing block U is contained inside the reference region W and the center of the reference region W matches the center of the referencing block U.

The information about the position and the shape of the reference region W, i.e., the relational information about the relation between the template block T and the reference region W, are stored in, for example, the internal memory 50 of the digital camera 100. In this case, the information about the position and the shape of the reference region W is read from the internal memory 50 by the micro computer 3, and transmitted to the memory part 60f. The memory part 60f temporarily stores the information about the position and the shape of the reference region W. The search region determination part 60b sets the reference region W to within the target image 71 based on the information about the reference region W stored in the memory part 60f.

Thus, the size of the reference region W may suffice if it is possible to contain at least the referencing block U inside the reference block W. Therefore, the reference region W can be made smaller than the region of the target image 71. For example, the size of the reference region W can be made equal to or smaller than half the size of the target image 71. In the first embodiment, the size of the target image 71 is the same as the size of the reference image 70, and thus, the size of the reference region W is smaller than the size of the reference image 70. In other words, the reference region W is smaller than the region of the photographed image. It is noted that the shape information of the reference region W includes the size information of the reference region W.

Figure 6C:
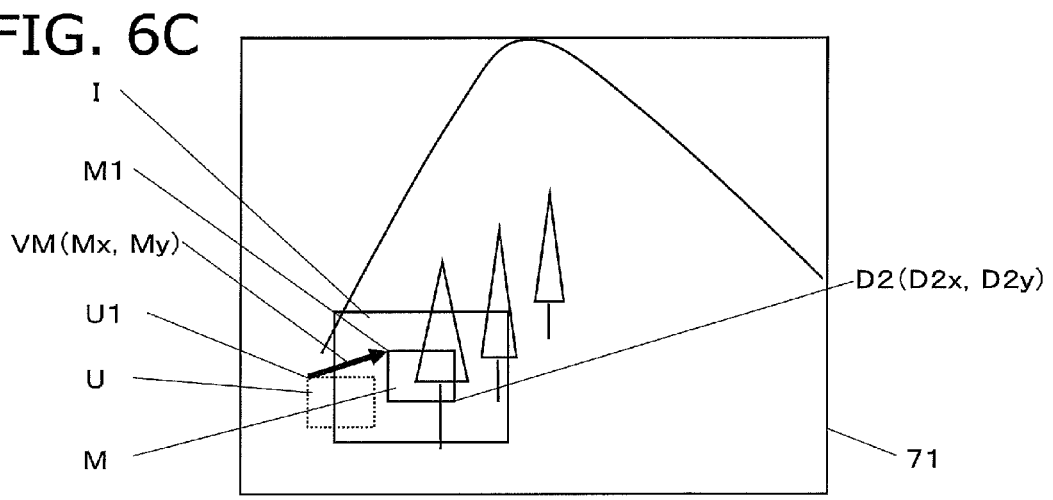
FIG. 6C is a concept view showing a method of detecting a motion vector VM.

The position on the image in the first embodiment means a position of a pixel on the image. Hereinafter, the position of the pixel on the obtained image is expressed by using two-dimensional coordinates. That is, for example, the position on the obtained image of a pixel D is expressed as D (i, j) where a pixel O at the leftmost and lowermost of the obtained image (FIG. 6A) is used as a reference. Values i and j are integers indicating a pixel number. At this time, the pixel D is separated from the pixel O by a pixel number i in the X-axis direction, and is positioned separated from the pixel O by a pixel number j in the Y-axis direction. In FIG. 6A to FIG. 6C, a horizontal direction of the sheet is the X-axis direction and a vertical direction is the Y-axis direction.

In the internal memory 50 of the digital camera 100, for example, information representing positions of pixels Q1 to Q4, i.e., four vertexes of the rectangular reference region W is stored. The positions of the pixels Q1 to Q4 are to be represented as Q1(X01, Y01), Q2(X02, Y02), Q3(X03, Y03), and Q4(X04, Y04) by using the two-dimensional coordinates. It is noted that the coordinates of the four vertexes of the reference region W are to be stored in the internal memory 50, however, one coordinate of the vertexes of the reference region W, and lengths of a longer side and a shorter side may be stored in the internal memory 50.

As shown in FIG. 6B, the search region determination part 60b moves the position of the reference region W based on the remaining shake amount corresponding to the target image 71, and sets the position of the reference region W to the search region I. In FIG. 6B, the remaining shake amount is represented by a vector VR (Rx, Ry). The vector VR is a two-dimensional vector amount on the target image 71, as described above, and Rx represents the X component of the remaining shake amount calculated based on Equation (1). Moreover, Ry represents the Y component of the remaining shake amount calculated based on Equation (2). The search region determination part 60b moves the reference region W in parallel by the direction and the magnitude indicated by a vector VA (−Rx, −Ry) in an opposite direction of the vector VR.

Specifically, the search region determination part 60b reads the information representing the positions of the pixels Q1 to Q4 from the memory part 60f. Further, the search region determination part 60b changes the information representing the positions of the pixels Q1 to Q4 based on the remaining shake amount to generate information representing the new positions. That is, the information representing the positions of the pixels P1 to P4, i.e., the four vertexes of the rectangular search region I, is generated. In this case, the positions of the pixels P1 to P4 are to be represented as P1(X1, Y1), P2(X2, Y2), P3(X3, Y3), and P4(X4, Y4), respectively.

At this time, the positions of the pixels P1 to P4 are associated with the positions of the pixels Q1 to Q4 by the vector VR (or the vector VA). That is, the position P1 (X1, Y1) of the pixel P1 is represented by P1 (X01-Rx, Y01-Ry) by using the position of the pixel Q1. Likewise, the positions of the pixels P2 to P4 are represented as P2(X02-Rx, Y02-Ry), P3(X03-Rx, Y03-Ry), and P4(X04-Rx, Y04-Ry), respectively.

Thus, the search region determination part 60b combines the newly generated information about the coordinates of the four vertexes P1 to P4 and the shape information of the reference region W so as to generate information for designating the search region I. Moreover, the search region determination part 60b extracts the image data representing the search region I from the image data representing the target image 71. The image data representing the search region I is stored in the memory part 60f.

As described above, the search region I is set to the position obtained by shifting the reference region W based on the remaining shake amount. Therefore, even when the remaining shake angle occurs as a result of the shake correction part 15 performing an operation different from the typical shake correction such as the centering, it is possible to appropriately set the search region I, as a detection area, on the image. Therefore, it is possible to reduce an erroneous detection in the template matching that is performed thereafter.

When the search region I is determined, the template detection part 60c executes search in the search region I (S206). The search in this case is performed by a so-called template matching. As shown in FIG. 6B, by the template matching, a matching region M most resembling the template block T is searched within the search region I.

In FIG. 6B, a part of the matching region M protrudes to outside the reference region W. Thus, even when the template matching is executed on the reference region W, it is not possible to exactly detect the matching region M. In contrary, the search region I is set to the position modified based on the remaining shake amount, and thus, the matching region M is contained inside. As described above, when the template matching is executed on the search region I, it is possible to exactly detect the matching region M even when the remaining shake angle occurs.

In the template matching, the template T and the search region I are compared. Specifically, a region cut from the search region I so that the search region I is the same in size as the template T (hereinafter, referred to as "comparison region") and an index amount representing the resemblance to the template T (an example of a characteristic amount) are calculated. More particularly, in the template matching, the template block T is moved by each pixel within the search region I, and Sum of Absolute Difference (SAD) is calculated at the moved position. SAD is a value obtained by totaling an absolute value of a difference between a pixel value of the template block T and a pixel value of the comparison region, and is an example of the index amount. Moving the comparison region by each pixel on the search region I and calculating SAD are repeatedly executed, so that a comparison region in which SAD is at the minimum is detected. A comparison region overlapped with the template block T when the smallest SAD is obtained is determined to be the matching region M in the search region I. In this way, SAD characterizes the matching region M.

In the calculation of SAD, a difference in pixel value between the pixels at the same positions on the two-dimensional image is calculated when the template block T and the comparison region within the search region I are overlapped. As the pixel value, for example, brightness may be used. Moreover, the pixel used herein means not only a concept of a pixel but also a concept of a dot. The template detection part 60c performs the template matching by using the image data representing the search region I and the image data representing the template block T which are stored in the memory part 60f.

When the search is ended and the matching region M is detected, the motion vector detection part 60d detects the motion vector VM (S207). As shown in FIG. 6C, the motion vector VM represents a movement amount of a characteristic point between the reference image 70 and the target image 71 (point having the same characteristic on the subject). For example, a vector linking a vertex U1 of the referencing block U and a vertex M1 of the matching region M corresponding to the vertex U1 is the motion vector VM. In this way, the motion vector VM represents a change in position on the two-dimensional image of the matching region M.

In other words, the motion vector VM is a two-dimensional vector amount representing how far the subject in the target image 71 moves as a whole with respect to the subject in the reference image 70. For example, a two-dimensional coordinate axis is defined on the target image 71, and a component in each of the axis directions of the motion vector VM can be represented by a pixel number. The detected motion vector VM is temporarily stored in the memory part 60f. At this time, the motion vector VM is stored in the memory part 60f while being associated with the target image 71.

When the detection of the motion vector VM is ended, the reading part 60a determines whether or not all the continuous shots are read (S208). Whether or not the reading of continuous shots is ended is determined depending on whether the number of obtained images read by the reading part 60a reaches a previously set number of continuous shots. When it is determined that the reading is ended, the process proceeds to step S209. When it is determined that the reading is not ended, the process returns to step S203 at which a next image of the continuous shots is read and set to the target image 71.

When it is determined that the reading is ended by the reading part 60a, the continuous shots are overlaid in the synthesis part 60e so as to generate the synthesized image (S209). Specifically, the continuous shots other than the reference image 70 are overlaid on the reference image 70. The continuous shots other than the reference image 70 are overlaid on the reference image 70 so that the position of the matching region M matches the position of the template block T. That is, the synthesized image is generated when the position on the reference image 70 of the template block T and the position on the target image 71 of the matching region M are used as a reference.

Specifically, the synthesis part 60e overlays the continuous shots other than the reference image 70 on the reference image 70 by using the motion vector VM. When the reference image 70 is used as a reference, the positions of the subject in the continuous shots other than the reference image 70 are displaced by a direction and a magnitude represented by the corresponding motion vectors VM. Therefore, when the continuous shots other than the reference image 70 are deviated relative to the reference image 70 by the direction and the magnitude represented by the vectors obtained by inverting the motion vectors VM, the positions of the matching regions M can be made to match the position of the template block T.

Subsequently, when the image data items representing the continuous shots are added and the average of the image data items is evaluated while the continuous shots are overlaid, the synthesized image is generated. The synthesis part 60e obtains the image data representing the continuous shots from the image memory 9 via the reading part 60a. Moreover, the motion vectors VM corresponding to the respective continuous shots are obtained from the memory part 60f. By using the image data and the motion vector, the synthesis part 60e generates the synthesized image.

Overlaying the images will be explained by using the pixel D1 (D1x, D1y) and the pixel D2 (D2x, D2y) shown in FIG. 6A and FIG. 6C. D1x and D1y are an X coordinate and a Y coordinate on the reference image 70 of the pixel D1, respectively. Likewise, D2x and D2y are an X coordinate and a Y coordinate on the target image 71 of the pixel D2, respectively. In this case, the pixel data of the pixel D is represented as SIG(D). The pixel D2 on the target image 71 is a pixel corresponding to the pixel D1 on the reference image 70. Specifically, the pixel D2 is associated with the pixel D1 by the motion vector VM (Mx, My). That is, relations of D2x=D1x+Mx and D2y=D1y+My are established. In the first embodiment, the target image 71 is overlaid on the reference image 70, and thus, the pixel D3 on the synthesized image corresponding to the pixel D1 can be represented as the pixel D3 (D1x, D1y). Then, pixel data SIG(D3) of the pixel D3 is calculated by averaging pixel data SIG(D1) of the pixel D1 and pixel data SIG(D2) of the pixel D2. Specifically, SIG(D3) is calculated according to an equation of SIG(D3)=SIG(D1)/2+SIG(D2)/2. When similar processing is executed on another pixel data of the reference image 70 and the target image 71, the synthesized image is obtained from the reference image 70 and the target image 71. It is noted that SIG (D1) and SIG(D2) are simply averaged; however, SIG(D3) may be generated from SIG(D1) and SIG(D2) according to a method other than the averaging. Moreover, in the above example, the two images are overlaid; however, three or more images may also be overlaid.

When overlaying the continuous shots by the synthesis part 60e is ended at step S209, the image synthesizing processing at step S111 is ended. As described above, when the image synthesizing processing is ended, the micro computer 3 ends the calculation of the shake correction and the remaining shake amount. Then, the photography operation is ended.

1.3 Characteristics

The characteristics of the digital camera 100 are summarized below.

(1) In the digital camera 100, the selection unit 65 selects the search region I, which is the region for detecting the characteristic amount based on the image signal, based on the shake amount of the digital camera 100 and the movement amount of the second lens group holding frame 21. In the digital camera 100, when the characteristic amount is detected from the search region I, it is possible to decrease the influence exerted by the shake of the digital camera 100 on the detection of the characteristic amount. As a result, even when the shake correction mechanism 20 cannot completely correct the influence by the shake of the digital camera 100, it is possible to reduce a decrease in accuracy of the image processing.

(2) In the digital camera 100, the selection part 65 selects the search region I smaller than the region of a basic image 70 obtained based on the image signal. Specifically, the search region determination part 60b selects the search region I smaller than the region of the basic image 70 from the target image 71. In the digital camera 100, when SAD is detected in the search region I, it is possible to further decrease a data processing amount as compared to the case where SAD is detected in the entire target image 71. As a result, the efficient image processing is enabled.

(3) In the digital camera 100, the selection part 65 determines the position on the two-dimensional image of the search region I, based on the detected shake amount and the detected movement amount. More particularly, the search region determination part 60b determines the position on the target image 71 of the search region I, based on the remaining shake amount calculated by the remaining shake amount calculation part 62. Therefore, it is possible to determine the search region I so that the influence by the shake of the digital camera 100 is decreased. As a result, it is possible to decrease the influence exerted by the shake of the digital camera 100 on the detection of the characteristic amount, the erroneous detection of the characteristic amount can be restrained.

Moreover, since it is possible to relatively freely determine the position on the two-dimensional image of the search region I, even when the remaining shake amount is large to a certain extent, it is possible to determine the position of the search region I in line with the displacement of the subject on the image. As a result, it is possible to set a more effective search region I to detect the characteristic amount, the erroneous detection of the characteristic amount can be restrained.

(4) In the digital camera 100, the template detection part 60c detects the matching region M in which the smallest SAD is obtained, from the search region I. Moreover, the synthesis part 60e generates a synthesized image with reference to the position on the two-dimensional image of the matching region M from the continuous shots formed by a plurality of image signals obtained at different timings. Thus, in the digital camera 100, the synthesized image is generated with reference to the position on the two-dimensional image of the matching region M, and thus, a highly accurate synthesized image can be obtained.

(5) In the digital camera 100, the remaining shake amount calculation part 62 calculates a remaining shake amount based on the shake amount by the digital camera 100 and the movement amount of the second lens group holding frame 21. Moreover, the variation-width calculation part 64 calculates the remaining shake PP value within the exposure time. Whether or not the magnitude of the remaining shake PP value is equal to or less than a predetermined variation amount limit value is determined by the reading part 60a, and an obtained image that does not satisfy the condition is not used for generating the synthesized image. Thus, it becomes possible to further restrain the influence exerted by the shake generated within the exposure time on the synthesized image.

Second Embodiment

A digital camera 200 (an example of an imaging device) according to a second embodiment will be explained by using FIG. 9. It is noted that in the following explanation, the same reference numerals are assigned to configurations having the substantially same functions as those in the first embodiment, and its detailed explanation is omitted.

In the digital camera 200 according to the second embodiment, the remaining shake amount is outputted to the digital signal processor 8 from the remaining shake amount calculation part 62 immediately after the imaging is executed. Unlike the digital camera 100 of the first embodiment, in the digital signal processor 8, the position on the obtained image of the focus area is adjusted according to the remaining shake amount immediately after the imaging is executed.

2.1 Configuration of Digital Camera

As shown in FIG. 9B, in the digital signal processor 8, a focus-area adjustment part 42 is provided. The focus-area adjustment part 42 adjusts the position of a focus area (an example of a first image region) on the obtained image. In the second embodiment, a selection part 66 (an example of a selection part) is formed by the focus-area adjustment part 42, the remaining shake amount calculation part 62, and the micro computer 3. Except for the fact that the focus-area adjustment part 42 is provided inside the digital signal processor 8, the configuration of the digital camera 200 is the substantially same as that of the digital camera 100.

2.2 Operation of Digital Camera

The photography operation of the digital camera 200 is the substantially same as that of the first embodiment except for the processing of the contrast AF. Hereinafter, the contrast AF in the digital camera 200 will be explained.

In the contrast AF, a component at a certain frequency range is extracted from the image data representing the obtained image. The extracted component at the certain frequency range is integrated, for example, to calculate a signal level. The signal level in a certain region on the obtained image, i.e., the focus area, is detected at predetermined sampling intervals. The detected signal level is an evaluation value (an example of focal information and an example of a characteristic amount) of the obtained image. At this time, the first lens group L1 is driven in a direction in which the evaluation value is headed for a peak by the focus lens drive controller 41. When the evaluation value reaches a predetermined peak range, the focus lens drive controller 41 determines that the focusing is established, and ends the contrast AF.

During the processing, it is desired that the same subject is continuously captured within the focus area in order that the peak of the evaluation value can be exactly detected. When the peak of the evaluation value is not correctly detected, it is probable that the accuracy for the contrast AF deteriorates or a processing time required for the contrast AF increases. Therefore, in the digital camera 200, the position on the obtained image of the focus area is adjusted according to the remaining shake amount in an approximately real time.

Figure 4:
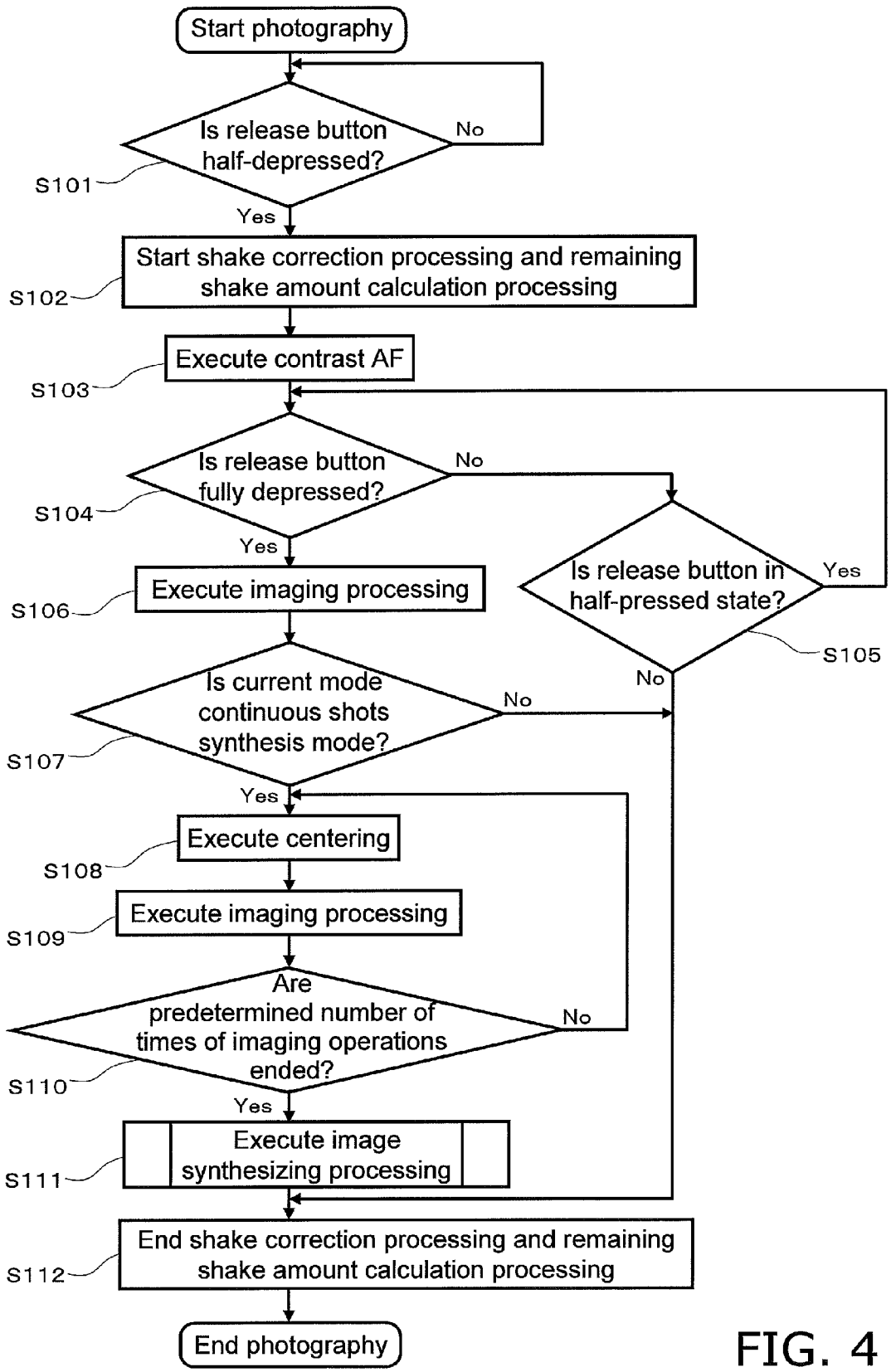
FIG. 4 is a flowchart of a photography operation in the digital camera 100.
Figure 5:
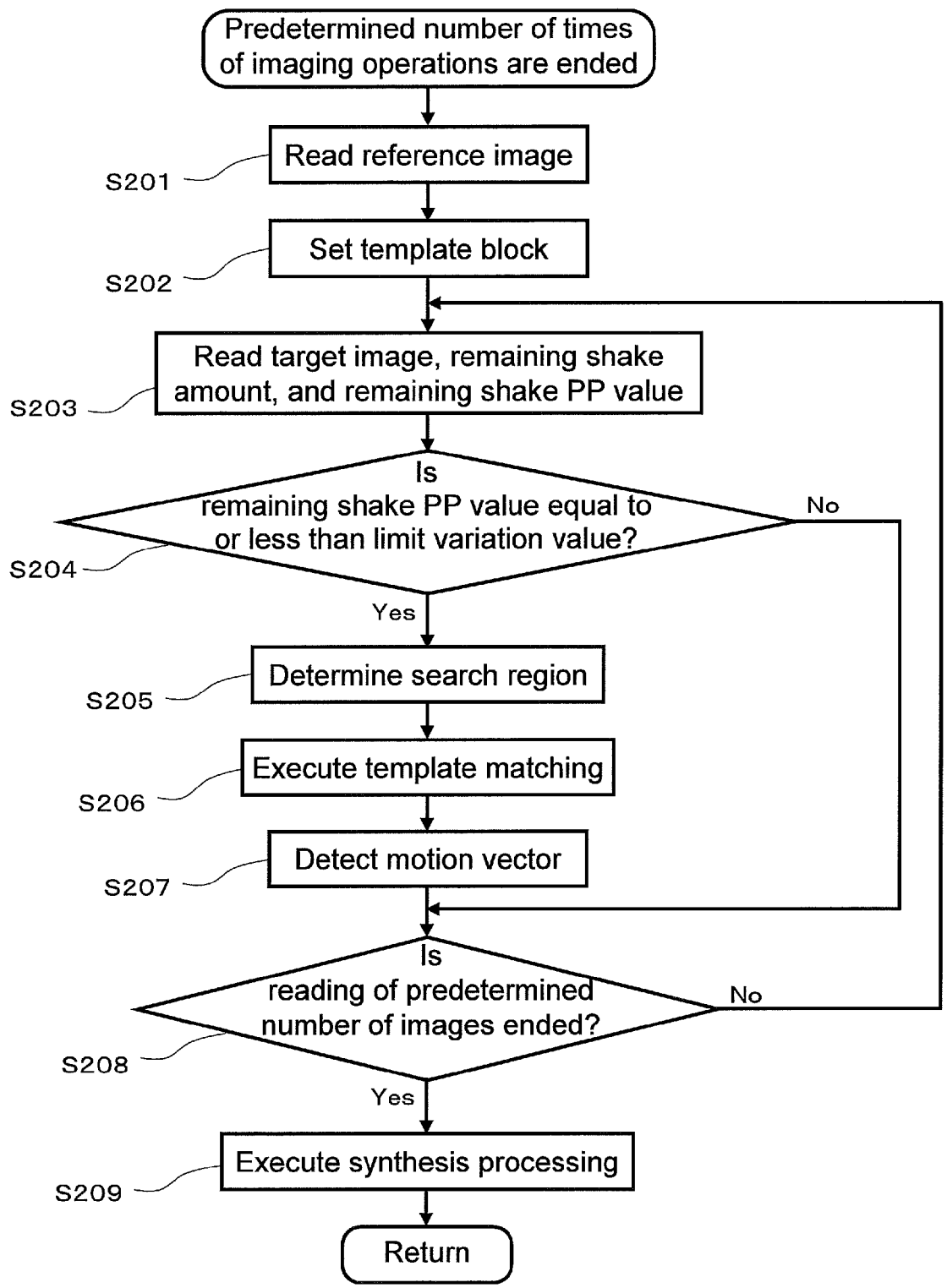
FIG. 5 is a flowchart of image synthesizing processing in the digital camera 100.

As shown in the flowchart in FIG. 4, after the shake correction and the remaining shake amount calculation are started, the contrast AF is executed at step S103. The contrast AF is executed during an exposure preparation period (see FIG. 7).

In the digital camera 200, a preset value of the focus area is applied to the focus-area adjustment part 42. The preset value of the focus area includes information about the position and the shape of the focus area in a default state. The preset value is previously stored in the internal memory 50, for example. In this case, the preset value is read from the internal memory 50 by the micro computer 3, and temporarily stored in a RAM 3a of the micro computer 3. The focus-area adjustment part 42 obtains the preset value from the RAM 3a. Moreover, to the focus-area adjustment part 42, the remaining shake amount is applied from the remaining shake amount calculation part 62. It is noted that the information about the shape of the focus area includes the size information of the focus area.

During the exposure preparation period shown in FIG. 7, when the shake correction processing is exactly executed, a value of the remaining shake angle is "0". If, due to some reason, so large a shake that the shake correction mechanism 20 reaches the correction end occurs during this period, then the remaining shake amount occurs. This remaining shake amount is detected by a method similar to that in the first embodiment, and transmitted to the focus-area adjustment part 42. Similarly to the above-described search region determination part 60b, the focus-area adjustment part 42 determines the position of the focus area on the obtained image, based on the preset value and the remaining shake amount.

Specifically, the focus-area adjustment part 42 displaces the position of the focus area designated by the preset value, on the obtained image based on the remaining shake amount which is the two-dimensional vector amount. More particularly, the focus-area adjustment part 42 moves the position of the focus area by the size of the remaining shake amount in a direction opposite to a vector representing the remaining shake amount.

That is, the focus-area adjustment part 42 modifies the position of the focus area in a default state defined by the preset value, based on the vector representing the remaining shake amount, and generates information representing the new position. Further, the focus-area adjustment part 42 combines the modified new position information and the information of the shape of the focus area defined by the preset value so as to update the information designating the focus area.

The focus-area adjustment part 42 applies the updated information about the position and the shape of the focus area, to the data extraction part 43. Moreover, to the data extraction part 43, the image data representing the obtained image is applied inside the digital signal processor 8. Based on the information about the position and the shape of the focus area, the data extraction part 43 extracts the image data corresponding to the new focus area from the image data representing the obtained image. The contrast calculation part 40 and the focus lens drive controller 41 perform the contrast AF based on the image data extracted by the data extraction part 43.

As described above, the focus area moves in a direction to cancel the shake influence, and thus, even when the digital camera 200 shakes, it is possible to keep capturing the same subject in the focus area.

Thus, in the digital camera 200, the evaluation value is calculated from the focus area of which the position is adjusted according to the remaining shake amount, and thus, the shake influence in the calculation of the evaluation value can be decreased. As a result, an erroneous operation of the focal control caused by the shake can be restrained. That is, even when the shake correction mechanism 20 reaches the correction end and the remaining shake angle occurs, the focus area can be appropriately set on the obtained screen, and the erroneous operation of the contrast AF can be decreased.

It is noted that when the remaining shake amount is equal to or less than a predetermined threshold value, the focus-area adjustment part 42 may be configured not to adjust the position of the focus area. Moreover, the technology discussed herein can be applicable to a digital camera having a contrast AF function. In the second embodiment, the digital camera 200 is configured to select the continuous shots synthesis mode; however, the digital camera 200 may not be equipped with the continuous shots synthesis mode.

Third Embodiment

A digital camera 300 (an example of an imaging device) according to a third embodiment will be explained by using FIG. 10. It is noted that in the following explanation, the same reference numerals are assigned to configurations having the substantially same functions as those in the first embodiment, and its detailed explanation is omitted. Unlike the digital camera 100, in the digital camera 300, a tracking part 63 is provided in which, for example, a noticed object is tracked based on color information. In tracking, at each time that the imaging is performed, the position of the object on the obtained image is detected.

3.1 Configuration of Digital Camera

Figure 10:
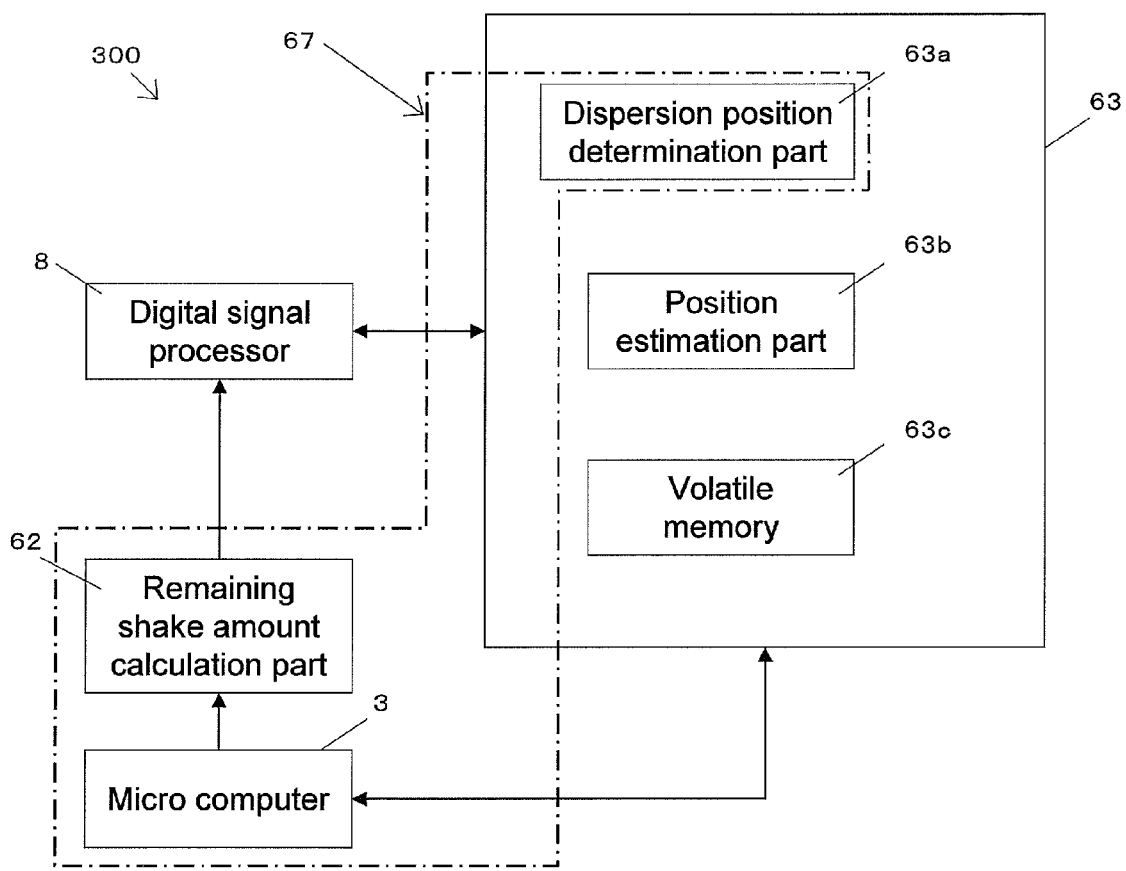
FIG. 10 is a block diagram showing the configuration of a tracking part 63 in a digital camera 300.

As shown in FIG. 10, the digital camera 300 includes the tracking part 63. The tracking part 63 and the digital signal processor 8 can transmit and receive data and a control signal to and from each other. Moreover, the tracking part 63 and the micro computer 3 can transmit and receive data and a control signal to and from each other. It is noted that the remaining shake amount corresponding to the obtained image is inputted to the tracking part 63 from the remaining shake amount calculation part 62 via the digital signal processor 8.

The tracking part 63 includes a dispersion position determination part 63a, a position estimation part 63b, and a volatile memory 63c. The dispersion position determination part 63a determines a position at which a particle (described later) is disposed. The position estimation part 63b detects the position of the object on the obtained image by using a particle filter. The volatile memory 63c temporarily stores information indicting the position of the object. Moreover, the volatile memory 63c temporarily stores information indicting the position of the particle. In the third embodiment, a selection part 67 (an example of a selection part) is formed by the dispersion position determination part 63a, the remaining shake amount calculation part 62, and the micro computer 3.

The configuration of the digital camera 300 is the substantially same as that of the digital camera 100 except for the provision of the tracking part 63.

3.2 Operation of Digital Camera

In the digital camera 300, when imaging is performed, an object that is a target of tracking (hereinafter, referred to as "target object") is detected from the obtained image obtained by the imaging. To detect the target object, information representing a characteristic of the target object is used. In this case, the information representing the characteristic of the target object is color information (an example of a characteristic amount) of the target object. The color information is, for example, information representing a characteristic color of the appearance of the target object. In this case, the color may be represented by a mixture proportion of three primary colors (red, blue, and green) so that the mixture proportion of the three primary colors can be used as the color information.

Designation of Target Object

The target object is designated by the user. Moreover, the color information is extracted from the designated target object. For example, the user designates the target object from the photographed image displayed on the display part 14 by using a touch panel (not shown) provided to the display part 14. In this case, the user designates the target object by touching the target object on the touch panel.

The micro computer 3 calculates the color information of the designated target object by using the image data representing the photographed image. The calculated color information is conveyed to the position estimation part 63b from the micro computer 3. Moreover, the position in the photographed image corresponding to the position at which the user touches on the touch panel is detected. The detected position information is conveyed to the dispersion position determination part 63a via the micro computer 3, and set to an initial position of the target object.

When the designation of the target object is ended, the image data representing the obtained image is inputted to the position estimation part 63b from the digital signal processor 8, and the target object is detected from the obtained image. As a detection method based on the color information, a particle filter is used in this case. An object tracking method using the particle filter is discussed in Japanese Patent Laid-Open Publication No. JP2009-182624, for example. The particle in this case is information for designating the position on the obtained image. In this method, a likelihood of the particle is calculated, and the likelihood represents an amount of pixels having color information identical to or resembling the color information of the target object in the vicinity of the particle. Based on the calculated likelihood and the position of the particle, the position of the target object is detected. In the particle filter, a selection step, a prediction step, and a measurement step are executed.

At the selection step, a plurality of particles are dispersedly disposed in surrounding areas centered around an initial position of the target object by the dispersion position determination part 63a. The position of the particles is conveyed to the position estimation part 63b. In the position estimation part 63b, the likelihood in each of the particles is calculated. Subsequently, N particles are selected according to a probability proportional to the level of the likelihood. At this time, the same particle may be redundantly selected. When the particle is redundantly selected, it is regarded that there are a plurality of particles at the same position. At the prediction step, the particles with a high likelihood selected at the selection step are randomly dispersed on the obtained image and re-disposed. At the measurement step, the likelihood of each of the particles is calculated again. Then, the positions of the all particles are averaged by using the likelihood as weighting. That is, the likelihood is used as the weighting, and weighted averaging of the positions of the particles is calculated. The obtained average value is estimated to be the position of the target object. It is possible that processing from re-disposition of the particles to estimation of the position may be repeated for several times so as to enhance the accuracy of the estimation.

As described above, in the position estimation part 63b, the position of the target object is detected based on the information designated by the user. The information representing the position of the detected subject is temporarily stored in the volatile memory 63c.

Tracking of Target Object

Subsequently, the image data representing the obtained image is newly inputted to the tracking part 63 from the digital signal processor 8 so that the target object is detected. At this time, the remaining shake amount corresponding to the obtained image is also inputted to the tracking part 63. The target object is detected by using the particle filter similarly to the above-described case. That is, the selection step, the prediction step, and the measurement step are executed.

At the selection step, the dispersion position determination part 63a disperses the particles through a two-stage step. At a first step, the dispersion position determination part 63a obtains the information representing the position of the target object from the volatile memory 63c, and dispersedly disposes the particle around the target object. That is, as a result of the particles being dispersed, the pixel at a position at which the particle is disposed is designated. The position at which the particle is disposed at this time is a temporary disposition position. The information representing the temporary disposition position is temporarily stored in the volatile memory 63c.

At a subsequent second step, the dispersion position determination part 63a moves the temporary disposition position based on the remaining shake amount. That is, the dispersion position determination part 63a reads information of the temporary disposition position from the volatile memory 63c, and moves the temporary disposition position based on the remaining shake amount. At this time, a disposition position obtained by moving the temporary disposition position is a real disposition position. Information representing the real disposition position is conveyed to the position estimation part 63b.

Thus, when the position at which the particle is disposed is moved, the pixel on the obtained image (an example of a first image region) is newly designated. A method in which the dispersion position determination part 63a moves the temporary disposition position to the real disposition position is similar to that in the search region determination part 60b in the first embodiment. The position of the temporary disposition position is adjusted based on the remaining shake amount, and the real disposition position is calculated.

The position estimation part 63b calculates the likelihood of the particle disposed at the real disposition position, and processing of the particle filter is executed. That is, the prediction step and the measurement step are executed. The position of the target object detected in the position estimation part 63b is temporarily stored in the volatile memory 63c again. In the digital camera 300, when a tracking function is effective, the position of the target object on the obtained image is detected at each time that the imaging is performed. The information representing the position of the target object is read, where appropriate, by the micro computer 3, and used for various types of control operations.

As described above, in the digital camera 300, even when the shake correction mechanism 20 reaches the correction end and the remaining shake angle occurs, the disposition position of the particle is adjusted based on the remaining shake amount. Thus, the position at which the particles are dispersedly disposed, as a detection area in object tracking processing, can be appropriately set on the image by eliminating the influence of the remaining shake amount, and thus, the erroneous operation in the object tracking processing can be decreased.

It is noted that, the color information, as a tracking algorism, is used in the third embodiment; however, this is not always the case. The technology shown herein can be applied to other various types of tracking algorism. Moreover, when the remaining shake amount is equal to or less than a predetermined threshold value, the position at which the particles are dispersed may not be adjusted. Moreover, in the digital camera 300 according to the third embodiment, the continuous shots synthesis mode is selectable; however, the continuous shots synthesis mode may not always be selectable. A digital camera not provided with the continuous shots synthesis mode may be employed.

Other Embodiments

The embodiments according to the present invention are not limited to the above-described embodiments, and can be corrected and modified in various ways without departing from the gist of the present invention.

(1) In the above-described embodiments, the case where a still picture is mainly photographed by the digital camera has been explained; however, the above-described technology can be applied to an imaging device provided with the shake correction device. For example, the above-described technology can also be applied to an imaging device other than the digital camera such as a digital video camera or a mobile telephone provided with a camera.

(2) In the above-described embodiments, the synthesized image is generated in the continuous shots processor 60 after ending the multiple imaging operations; however, this is not always the case. For example, the image data may be conveyed to the continuous shots processor 60 at each execution of the imaging processing and the synthesizing processing may be sequentially performed in parallel with the imaging processing.

(3) In the above-described embodiments, when the release button 35 is half-depressed, the calculation of the shake correction and the remaining shake amount is started, and without any interruption, the contrast AF is executed; however, this is not always the case. For example, a system where the calculation of the shake correction and the remaining shake amount is started immediately after the power supply of the digital camera 100 is turned on may be employed.

(4) In the above-described embodiments, the imaging processing and the centering in the continuous shots synthesis mode are executed in order; however, this is not always the case. For example, various image data processing operations performed after the exposure time is ended may be executed in parallel with the centering.

Moreover, the centering may be omitted.

(5) In the above-described embodiments, the remaining shake amount is calculated by using the shake angle obtained from the output of the angular velocity sensor 17 and the correction angle calculated based on the output signal of the position detection part 16; however, the remaining shake amount may be calculated by using a method other than this. For example, a method in which the movement amount of the characteristic region on the image may be calculated by image processing so that the remaining shake amount is estimated may be employed.

(6) In the above-described embodiments, the remaining shake amount obtained at the time of starting the exposure is used for the image processing such as selection of the search region I; however, the remaining shake amount obtained at the time of starting the exposure may not always be used. For example, a remaining shake amount at a time point at which the exposure time is ended may be used. Moreover, an average value of the remaining shake amounts within the exposure time is calculated by monitoring the remaining shake amount, and the resultant average value may be used as the remaining shake amount.

(7) In the above-described embodiment, when the remaining shake PP value exceeds the predetermined limit variation value, the corresponding obtained image is excluded from a target to be synthesized; however, this is not always the case. For example, only when the remaining shake PP values corresponding to all the obtained images included in the continuous shots are equal to or less than a predetermined threshold value (an example of a second upper limit), the synthesized image may be generated. It is noted that when the synthesized image is not generated, the following can be possible: one obtained image is selected from the continuous shots, and outputted, instead of the synthesized image, to the image memory 9.

Alternately, only the obtained image imaged before the remaining shake PP value exceeds the threshold value, out of the continuous shots, may be used to generate the synthesized image.

When the above-described system is configured, it is possible to generate the synthesized image in which the influence by shake is restrained.

(8) In the above-described embodiments, the processing of setting the search region I by moving the reference region W is performed on all the obtained images included in the continuous shots. However, when the remaining shake amount is equal to or less than the predetermined threshold value, the search region determination part 60b may be configured not to execute the adjustment of the position of the search region I. For example, the search region I may be set to the same position as the search region I on the obtained image imaged at the last minute. With this configuration, a processing amount at the time of determining the search region I becomes smaller. As a result, it is possible to decrease the scale of a circuit required for performing the image processing, and consumption power of the digital camera can be reduced.

Figure 11:
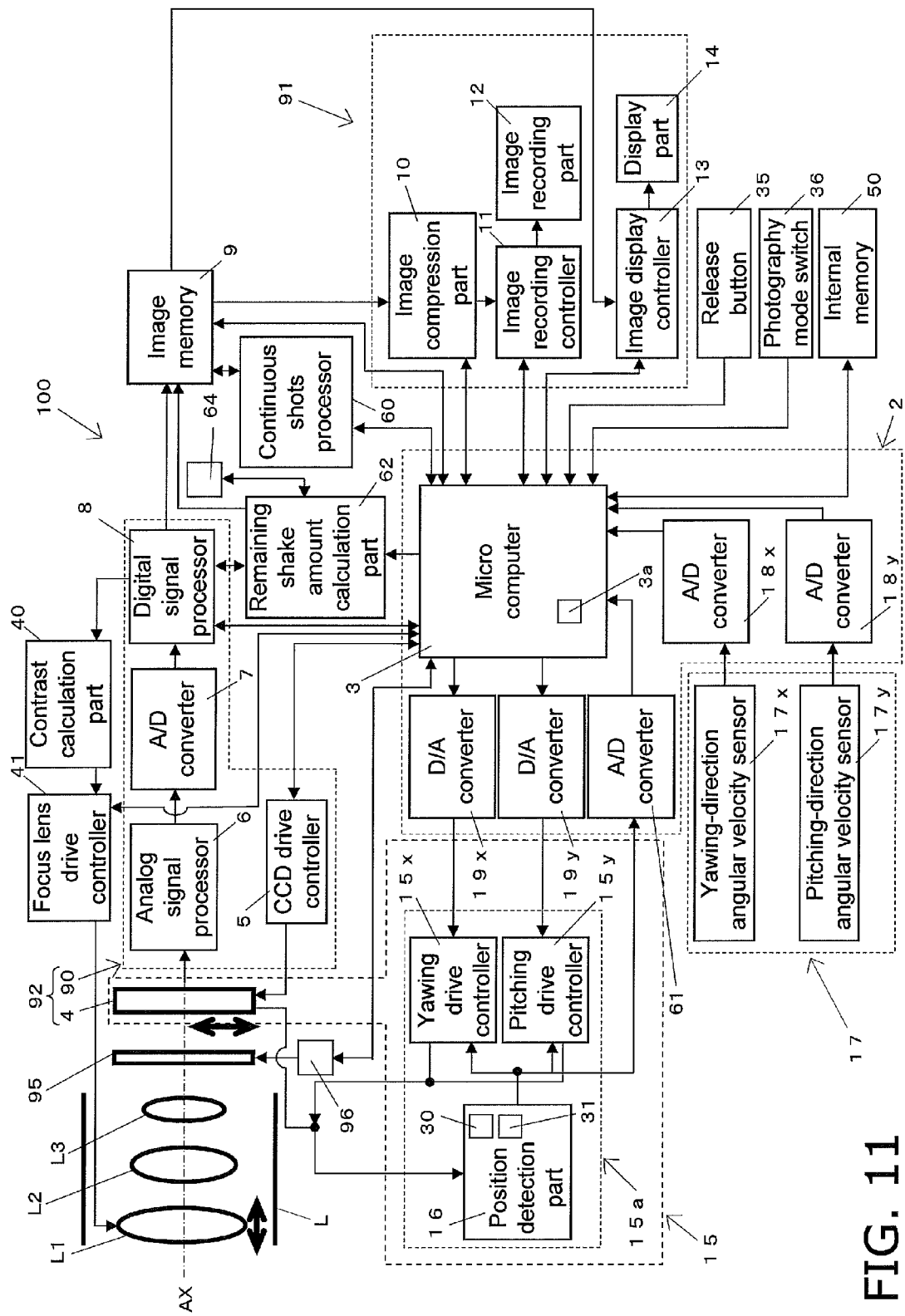
FIG. 11 is a block diagram of a whole configuration of a digital camera 100 in accordance with another embodiment of the present invention.

(9) In the above-described embodiments, the shake correction is performed by changing the position of the second lens group L2; however, the shake correction may be performed by moving another component. For example, the influence by shake can be reduced by moving the CCD 4. Thus, in FIG. 11, the CCD 4 is an example of a movable part as well.

(10) In the above-described embodiments, the preset value for designating the position and the shape of the focus area in a default state is previously stored in the internal memory 50; however, information representing the focus area in a default state may be designated by a method other than the above. For example, information about the position and the shape of the focus area obtained by tracking the subject may be used as initial information about the position and the shape of the focus area.

(11) In the imaging device explained in the above-described embodiments, the processing in the respective blocks may be realized by individual hardware configurations; however, the hardware may be caused to execute the processing of several different blocks. For example, by causing the micro computer to read various types of programs, the micro computer may be caused to perform the processing in each block of the imaging device. Moreover, the order of executing the processing methods in the above-described embodiments is not necessarily limited to that described in the embodiments, and the execution order may be changed without departing from the gist of the invention.

With the embodiments of the imaging devices disclosed herein above, even when the influence of the shake of the imaging device is not sufficiently decreased by the shake correction device, it is possible to reduce a decrease in processing accuracy on an obtained image.

General Interpretation of Terms

In understanding the scope of the present disclosure, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of the imaging device. Accordingly, these terms, as utilized to describe the present invention should be interpreted relative to the imaging device.

The term "configured" as used herein to describe a component, section, or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. An imaging device comprising:
   an optical system configured to form an optical image of a subject;
   an imaging unit configured to receive an image signal of the optical image;
   a first detection unit configured to detect the amount of vibration of the imaging device;
   a movable member including at least one of a portion of the optical system and a portion of the imaging unit;
   a drive unit configured to move the movable member based on the detected amount of vibration of the imaging device;
   a second detection unit configured to detect the amount of movement of the movable member; and
   a selection unit configured to select a first image area based on the detected amount of vibration of the imaging device and based on the detected amount of movement of the movable member, the first image area being used to determine a characteristic value based on the image signal.

2. The imaging device according to claim 1, wherein the selected first image area is smaller than a region of a photographed image obtained based on the image signal.

3. The imaging device according to claim 1, wherein the selection unit is further configured to determined a position on a two-dimensional image of the first image area based on the detected amount of vibration of the imaging device and the detected amount of movement of the movable member.

4. The imaging device according to claim 1, further comprising
   a third detection unit configured to detect a characteristic area on the first image area provided the characteristic value satisfies a predetermined condition; and
   a synthesis unit configured to generate a synthesized image from a plurality of the image signals obtained at different times, the synthesized image being generated relative to the position of the characteristic area on a two-dimensional image of the first image area.

5. The imaging device according to claim 4, further comprising
   a fourth detection unit configured to detect a motion vector that represents a change in the position of the characteristic area on a two-dimensional image,
   wherein the synthesis unit uses the motion vector to generate the synthesized image.

6. The imaging device according to claim 4, wherein the selection unit includes a first calculation unit configured to calculate the amount of vibration remaining based on the detected amount of vibration of the imaging device and the detected amount of movement of the movable member.

7. The imaging device according to claim 6, further comprising
   a determination unit configured to determine whether the synthesis unit generated the synthesized image based on the amount of vibration remaining.

8. The imaging device according to claim 1, further comprising
   a focusing unit configured to calculate focusing information which represents a state of focus of the subject; and
   a controller operatively coupled to the optical system to control the optical system based on the calculated focusing information which represents the state of focus of the subject, wherein
   the focusing information is equivalent to the characteristic value which is determined based on the first image area.

9. The imaging device according to claim 1, wherein the characteristic value is information that represents a specific color.

10. An imaging device comprising:
    an optical system configured to form an optical image of a subject;
    an imaging unit configured to receive an image signal of the optical image;
    a first detection unit configured to detect the amount of vibration of the imaging device;
    a movable member including at least one of a portion of the optical system and a portion of the imaging unit;
    a drive unit configured to move the movable member based on the detected amount of vibration of the imaging device;

a second detection unit configured to detect the amount of movement of the movable member;

a first calculation unit configured to calculate the amount of vibration remaining based on the detected amount of vibration of the imaging device and the detected amount of movement of the movable member; and a second calculation unit configured to calculate a variation width of the amount of vibration remaining within a predetermined time.

11. The imaging device according to claim 10, further comprising an exposure unit configured to adjust an exposure time of the imaging unit, wherein the second calculation unit is further configured to calculate the variation width within the exposure time.

12. The imaging device according to claim 10, further comprising a synthesis unit configured to generate a synthesized image from a plurality of the image signals obtained at different times.

13. The imaging device according to claim 12, wherein the synthesized image is generated using only the image signal, out of a plurality of image signals obtained at different times, that corresponds to a variation width that is less than or equal to a first upper limit.

14. The imaging device according to claim 12, wherein the synthesized image is generated when each of the plurality of image signals corresponds to a variation width that is less than or equal to a second upper limit.

* * * * *